(12) United States Patent
Weinstein et al.

(10) Patent No.: US 9,547,657 B2
(45) Date of Patent: Jan. 17, 2017

(54) METHODS AND SYSTEMS FOR EFFICIENT COMPARISON OF FILE SETS

(71) Applicant: Black Duck Software, Inc., Burlington, MA (US)

(72) Inventors: Damon Alexander Weinstein, Arlington, MA (US); Randolph Byrd Kilmon, Jr., Wayland, MA (US)

(73) Assignee: Black Duck Software, Inc., Burlington, MA (US)

( * ) Notice: Subject to any disclaimer, the term of this patent is extended or adjusted under 35 U.S.C. 154(b) by 401 days.

(21) Appl. No.: 14/182,711

(22) Filed: Feb. 18, 2014

(65) Prior Publication Data

US 2015/0234885 A1   Aug. 20, 2015

(51) Int. Cl.
*G06F 17/00* (2006.01)
*G06F 17/30* (2006.01)

(52) U.S. Cl.
CPC .............. *G06F 17/30109* (2013.01)

(58) Field of Classification Search
CPC   G06F 11/1417; G06F 12/084; G06F 12/0871; G06F 12/0891; G06F 12/12; G06F 12/1483
See application file for complete search history.

(56) References Cited

U.S. PATENT DOCUMENTS

| | | | |
|---|---|---|---|
| 6,101,507 A | 8/2000 | Cane et al. | |
| 7,124,408 B1 | 10/2006 | Parthasarathy et al. | |
| 7,908,276 B2 | 3/2011 | Dodge et al. | |
| 8,589,362 B1 | 11/2013 | Braam et al. | |
| 2005/0125524 A1 | 6/2005 | Chandrasekhar et al. | |
| 2011/0225115 A1* | 9/2011 | Moitra | G06F 17/30864 706/50 |
| 2011/0283368 A1 | 11/2011 | Gasparri et al. | |
| 2013/0080485 A1 | 3/2013 | Pudipeddi et al. | |
| 2013/0191350 A1 | 7/2013 | Esaka et al. | |

(Continued)

OTHER PUBLICATIONS

Godfrey, Michael et al., Using Origin Analysis to Detect Merging and Splitting of Source Code Entities, IEEE Transaction on Software Engineering, vol. 31, No. 2, 2005, 15 pgs.

(Continued)

*Primary Examiner* — Truong Vo
(74) *Attorney, Agent, or Firm* — Foley and Lardner LLP; John D. Lanza

(57) ABSTRACT

Aspects and implementations of the present disclosure are directed to methods and systems for comparing sets of files using signatures. In general, in some implementations, an audit system compares a first plurality of signatures representing element information for a first file hierarchy to a second plurality of signatures representing element information for a second file hierarchy. The audit system determines, based on the comparison of the first plurality of signatures to the second plurality of signatures, whether the first file hierarchy is likely to be a modified copy of the second file hierarchy. In some implementations, the audit system compares signatures of a first signature type, selects a second signature type based on the comparison using the first signature type, and compares signatures of the second signature type. In some implementations, the second plurality of signatures is stored in a catalog of signatures representing various file hierarchies.

18 Claims, 13 Drawing Sheets

(56) References Cited

U.S. PATENT DOCUMENTS

2013/0198459 A1    8/2013  Joshi et al.

OTHER PUBLICATIONS

Barreto, Joao et al., Hash Challenges: Stretching the Limits of Compare-by-Hash in Distributed Data Deduplication Information Processing Letters, *Information Processing Letters*, Elsevier, vol. 112, No. 10, May 2012, 11 pgs.
Schwarz, Thomas et al., Low Cost Comparisons of File Copies, Proceedings of 10th Int. Conf. on Distributed Computing Systems, IEEE, May 1990, 7 pgs.
Jain, Navendu et al., TAPER: Tiered Approach for Eliminating Redundancy in Replica Synchronization, 4th Usenix Conf. on File and Storage Technologies, vol. 5, Dec. 2005, 14 pgs.
Buttler, David. A Short Survey of Document Structure Similarity Algorithms, In *International Conference on Internet Computing*, Jun. 2004, 7 pgs, Lawrence Livermore National Laboratory Livermore, CA 94550.

\* cited by examiner

Deep with Size                                          410

@Bravo.TXT:1061@@Charlie.EXE:54331@@Delta.ZIP:839@
Echo>@Foxtrot.DAT:1259@@Golf.DAT:3511@<Hotel>
@Foxtrot.DAT:1259@@Golf.DAT:5167@<India>Echo>
@Foxtrot.DAT:1259@@Golf.DAT:3511@<<Juliett><

  7D372393B8FA2DE84515C10C53CA2CA0   412

Deep no Size                                             420

@Bravo.TXT@@Charlie.EXE@@Delta.ZIP@Echo>
@Foxtrot.DAT@@Golf.DAT@<Hotel>@Foxtrot.DAT@
@Golf.DAT@<India>Echo>@Foxtrot.DAT@@Golf.DAT@<<
Juliett><

  1D6DD05A7F026E1473E65ED1C31968C8   422

Shallow with Size                                        430

@Bravo.TXT:1061@@Charlie.EXE:54331@@Delta.ZIP:839@
Echo><Hotel><India><Juliett><

  C7487A9E24F5CDFCC4F8A7C1004BA236   432

Shallow no Size                                          440

@Bravo.TXT@@Charlie.EXE@@Delta.ZIP@Echo><
Hotel><India><Juliett><

  FDCE50E20AB32C51F9DE9CFD87C9E3DC   442

Figure 4A

METHODS AND SYSTEMS FOR EFFICIENT COMPARISON OF FILE SETS

BACKGROUND

Generally, computing devices store data as files in a data storage system. The data storage system stores and indexes the file content for later retrieval. The index is typically represented as a tree-like hierarchy of directories, also sometimes referred to as folders. Each directory represents a grouping of zero or more files and sub-directories. The hierarchy of directories has one root node (the only directory with no parent directory), zero or more intermediate nodes (sub-directories), and zero or more leaf nodes (files and/or directories with no sub-directories). A file hierarchy can be packaged (with or without compression) into an archive file, which resides in a file system like a file but contains files and sub-directories like a directory. Thus an archive can be viewed as a leaf node, as an intermediate node, or as both.

A set of files may be replicated within a data storage system or from one data storage system to another. In some instances, the replicated data is unchanged from copy to copy. In other instances, the replicated data is modified. The modifications may be as simple as a bit or two altered in one file or the modification may be more extensive. Generally, there are three types of modifications: changes to individual file contents, addition or deletion of files (including changes to file names), and addition or deletion of directories (including changes to directory names). However, even when there have been modifications in a replicated file hierarchy, the replica set of files may still have similarities to the original set of files.

SUMMARY

Aspects and implementations of the present disclosure are directed to methods and systems for comparing sets of files using signatures. In general, in some implementations, an audit system compares a first plurality of signatures representing element information for a first file hierarchy to a second plurality of signatures representing element information for a second file hierarchy. The audit system determines, based on the comparison of the first plurality of signatures to the second plurality of signatures, whether the first file hierarchy is likely to be a modified copy of the second file hierarchy. In some implementations, the audit system compares signatures of a first signature type, selects a second signature type based on the comparison using the first signature type, and compares signatures of the second signature type. In some implementations, the second plurality of signatures is stored in a catalog of signatures representing various file hierarchies. In some implementations of the method, the method includes identifying, by the audit system, a first difference between the first file hierarchy and the second file hierarchy.

In one aspect, the disclosure relates to a method for comparing a first file hierarchy to one or more other file hierarchies, the other file hierarchies comprising at least a second file hierarchy. The method includes comparing, by an audit system comprising at least one computing processor, a first plurality of signatures representing element information for the first file hierarchy to a second plurality of signatures representing element information for the second file hierarchy. The method includes determining, by the audit system, based on the comparison of the first plurality of signatures to the second plurality of signatures, whether the first file hierarchy is likely to be a modified copy of the second file hierarchy. In some implementations, the audit system returns a score representative of a probability that the first file hierarchy is a modified copy of the second file hierarchy. In some implementations, the audit system outputs a report detailing indicators that the first file hierarchy is, or is not, related to the second file hierarchy.

In some implementations of the method, the method includes comparing, by the audit system, a first signature of a first signature type from the first plurality of signatures to a second signature of the first signature type from the second plurality of signatures; selecting a second signature type based on the comparison of the first signature of the first signature type to the second signatures of the first signature type; and comparing a first signature of the second signature type from the first plurality of signatures to a second signature of the second signature type from the second plurality of signatures. In some implementations, the first signature type is for signatures representing a first set of element attributes and the second signature type is for signatures representing a second set of element attributes, the first set of element attributes comprising at least one attribute not present in the second set of element attributes.

In some implementations of the method, the method includes comparing, by the audit system, a first signature from the first plurality of signatures to a second signature from the second plurality of signatures, wherein the first signature and the second signature each comprise a representation of element descriptors created according to a first set of string descriptor formatting rules and a first set of element selection criteria. In some implementations, the representation is a fixed-length digest of a string descriptor comprising a deterministic aggregation of the element descriptors. In some implementations, the fixed-length digest is calculated using one of: a cyclic redundancy check, a message digest, an MD5 hash function, a cryptographic hash, and a non-cryptographic hash function.

In some implementations of the method, the method includes comparing, by the audit system, a first signature from the first plurality of signatures to a second signature from the second plurality of signatures, wherein the first signature and the second signature are of a first signature type representative of multiple directory levels; and comparing, by the audit system, a third signature from the first plurality of signatures to a fourth signature from the second plurality of signatures, wherein the third signature and the fourth signature are of a second signature type representative of a single directory level.

In some implementations of the method, the method includes determining, by the audit system, based on the comparison of the first plurality of signatures to the second plurality of signatures, that the first file hierarchy is not likely to be a modified copy of the second file hierarchy; comparing, by the audit system, a third plurality of signatures representing element information for the first file hierarchy to a fourth plurality of signatures representing element information for a third file hierarchy; and determining, by the audit system, based on the comparison of the third plurality of signatures to the fourth plurality of signatures, whether the first file hierarchy is likely to be a modified copy of the third file hierarchy.

In some implementations of the method, the method includes identifying a plurality of benchmark directories in the first file hierarchy and identifying the second file hierarchy as a file hierarchy containing one or more benchmark-matching directories, wherein each benchmark-matching directory has a signature of a first type equivalent to a signature of the first type for a corresponding benchmark directory. The method includes evaluating each benchmark-matching directory and corresponding benchmark directory to determine a strength of the correspondence. In some implementations of the method, an audit system determines a score for each correspondence and generates an aggregate score for the second file hierarchy; the aggregate score representative of the over-all likelihood of a same-source relationship between the first file hierarchy and the second file hierarchy. In some implementations of the method, an audit system determines whether the aggregate score indicates that the first file hierarchy is likely to be a modified copy of the second file hierarchy.

In some implementations of the method, the method includes comparing a first signature representative of a first directory of the first file hierarchy to a second signature representative of a second directory of the first file hierarchy, the first directory and the second directory each having an equivalent respective distance from root. The method includes identifying a difference or discrepancy between elements of the first directory and elements of the second directory based on the comparison. In some implementations, the method includes one or more additional signature comparisons. In some implementations of the method, one or more signatures for each sub-directory of a directory in the first file hierarchy is compared to one or more signatures for corresponding parallel sub-directories of a parallel directory in the second file hierarchy.

In another aspect, the disclosure relates to a system for comparing a first file hierarchy to one or more other file hierarchies, the other file hierarchies comprising at least a second file hierarchy. The system includes one or more computing processors configured to perform the operations of comparing a first plurality of signatures representing element information for the first file hierarchy to a second plurality of signatures representing element information for the second file hierarchy. The one or more computing processors are configured to perform the operations of determining, based on the comparison of the first plurality of signatures to the second plurality of signatures, whether the first file hierarchy is likely to be a modified copy of the second file hierarchy. In some implementations, the system returns a score representative of a probability that the first file hierarchy is a modified copy of the second file hierarchy. In some implementations, the system outputs a report detailing indicators that the first file hierarchy is, or is not, related to the second file hierarchy.

In some implementations of the system, the one or more computing processors are configured to perform the operations of comparing a first signature of a first signature type from the first plurality of signatures to a second signature of the first signature type from the second plurality of signatures; selecting a second signature type based on the comparison of the first signature of the first signature type to the second signatures of the first signature type; and comparing a first signature of the second signature type from the first plurality of signatures to a second signature of the second signature type from the second plurality of signatures. In some implementations, the first signature type is for signatures representing a first set of element attributes and the second signature type is for signatures representing a second set of element attributes, the first set of element attributes comprising at least one attribute not present in the second set of element attributes.

In some implementations of the system, The one or more computing processors are configured to perform the operations of comparing a first signature from the first plurality of signatures to a second signature from the second plurality of signatures, wherein the first signature and the second signature each comprise a representation of element descriptors created according to a first set of string descriptor formatting rules and a first set of element selection criteria. In some implementations, the representation is a fixed-length digest of a string descriptor comprising a deterministic aggregation of the element descriptors. In some implementations, the fixed-length digest is calculated using one of: a cyclic redundancy check, a message digest, an MD5 hash function, a cryptographic hash, and a non-cryptographic hash function.

In some implementations of the system, the one or more computing processors are configured to perform the operations of comparing a first signature from the first plurality of signatures to a second signature from the second plurality of signatures, wherein the first signature and the second signature are of a first signature type representative of multiple directory levels; and comparing a third signature from the first plurality of signatures to a fourth signature from the second plurality of signatures, wherein the third signature and the fourth signature are of a second signature type representative of a single directory level.

In some implementations of the system, the one or more computing processors are configured to perform the operations of determining, based on the comparison of the first plurality of signatures to the second plurality of signatures, that the first file hierarchy is not likely to be a modified copy of the second file hierarchy; comparing, a third plurality of signatures representing element information for the first file hierarchy to a fourth plurality of signatures representing element information for a third file hierarchy; and determining, based on the comparison of the third plurality of signatures to the fourth plurality of signatures, whether the first file hierarchy is likely to be a modified copy of the third file hierarchy.

In some implementations of the system, the one or more computing processors are configured to perform the operations of identifying a plurality of benchmark directories in the first file hierarchy and identifying the second file hierarchy as a file hierarchy containing one or more benchmark-matching directories, wherein each benchmark-matching directory has a signature of a first type equivalent to a signature of the first type for a corresponding benchmark directory. The one or more computing processors are configured to perform the operations of evaluating each benchmark-matching directory and corresponding benchmark directory to determine a strength of the correspondence. In some implementations, the one or more computing processors are configured to perform the operations of determining a score for each correspondence and generating an aggregate score for the second file hierarchy; the aggregate score representative of the over-all likelihood of a same-source relationship between the first file hierarchy and the second file hierarchy. In some implementations, the one or more computing processors are configured to perform the operations of determining whether the aggregate score indicates that the first file hierarchy is likely to be a modified copy of the second file hierarchy.

In some implementations of the system, the one or more computing processors are configured to perform the operations of comparing a first signature representative of a first directory of the first file hierarchy to a second signature representative of a second directory of the first file hierarchy, the first directory and the second directory each having an equivalent respective distance from root. The one or more computing processors are configured to perform the operations of identifying a difference or discrepancy between elements of the first directory and elements of the second directory based on the comparison. In some implementations, the one or more computing processors are configured to perform the operations of one or more additional signature comparisons. In some implementations, one or more signatures for each sub-directory of a directory in the first file hierarchy are compared to one or more signatures for corresponding parallel sub-directories of a parallel directory in the second file hierarchy.

In another aspect, the disclosure relates to tangible computer readable media storing instructions that, when executed by a computing system comprising one or more processors, cause the one or more processors to perform operations for comparing a first plurality of signatures representing element information for the first file hierarchy to a second plurality of signatures representing element information for the second file hierarchy. The instructions cause the one or more processors to perform operations for determining, based on the comparison of the first plurality of signatures to the second plurality of signatures, whether the first file hierarchy is likely to be a modified copy of the second file hierarchy. In some implementations, the instructions cause the one or more processors to return a score representative of a probability that the first file hierarchy is a modified copy of the second file hierarchy. In some implementations, the instructions cause the one or more processors to output a report detailing indicators that the first file hierarchy is, or is not, related to the second file hierarchy.

In some implementations of the tangible computer readable, the instructions, when executed by the one or more processors, cause the one or more processors to perform operations for comparing a first signature of a first signature type from the first plurality of signatures to a second signature of the first signature type from the second plurality of signatures; selecting a second signature type based on the comparison of the first signature of the first signature type to the second signatures of the first signature type; and comparing a first signature of the second signature type from the first plurality of signatures to a second signature of the second signature type from the second plurality of signatures. In some implementations, the first signature type is for signatures representing a first set of element attributes and the second signature type is for signatures representing a second set of element attributes, the first set of element attributes comprising at least one attribute not present in the second set of element attributes.

In some implementations of the tangible computer readable, the instructions, when executed by the one or more processors, cause the one or more processors to perform operations for comparing a first signature from the first plurality of signatures to a second signature from the second plurality of signatures, wherein the first signature and the second signature each comprise a representation of element descriptors created according to a first set of string descriptor formatting rules and a first set of element selection criteria. In some implementations, the representation is a fixed-length digest of a string descriptor comprising a deterministic aggregation of the element descriptors. In some implementations, the fixed-length digest is calculated using one of: a cyclic redundancy check, a message digest, an MD5 hash function, a cryptographic hash, and a non-cryptographic hash function.

In some implementations of the tangible computer readable, the instructions, when executed by the one or more processors, cause the one or more processors to perform operations for comparing a first signature from the first plurality of signatures to a second signature from the second plurality of signatures, wherein the first signature and the second signature are of a first signature type representative of multiple directory levels; and comparing a third signature from the first plurality of signatures to a fourth signature from the second plurality of signatures, wherein the third signature and the fourth signature are of a second signature type representative of a single directory level.

In some implementations of the tangible computer readable, the instructions, when executed by the one or more processors, cause the one or more processors to perform operations for determining, based on the comparison of the first plurality of signatures to the second plurality of signatures, that the first file hierarchy is not likely to be a modified copy of the second file hierarchy; comparing, a third plurality of signatures representing element information for the first file hierarchy to a fourth plurality of signatures representing element information for a third file hierarchy; and determining, based on the comparison of the third plurality of signatures to the fourth plurality of signatures, whether the first file hierarchy is likely to be a modified copy of the third file hierarchy.

In some implementations of the tangible computer readable, the instructions, when executed by the one or more processors, cause the one or more processors to perform operations for identifying a plurality of benchmark directories in the first file hierarchy and identifying the second file hierarchy as a file hierarchy containing one or more benchmark-matching directories, wherein each benchmark-matching directory has a signature of a first type equivalent to a signature of the first type for a corresponding benchmark directory. The instructions, when executed, cause the one or more processors to perform operations for evaluating each benchmark-matching directory and corresponding benchmark directory to determine a strength of the correspondence. In some implementations, the instructions, when executed, cause the one or more processors to perform operations for determining a score for each correspondence and generating an aggregate score for the second file hierarchy; the aggregate score representative of the over-all likelihood of a same-source relationship between the first file hierarchy and the second file hierarchy. In some implementations of the tangible computer readable, the instructions, when executed by the one or more processors, cause the one or more processors to perform operations for determining whether the aggregate score indicates that the first file hierarchy is likely to be a modified copy of the second file hierarchy.

In some implementations of the tangible computer readable, the instructions, when executed by the one or more processors, cause the one or more processors to perform operations for comparing a first signature representative of a first directory of the first file hierarchy to a second signature representative of a second directory of the first file hierarchy, the first directory and the second directory each having an equivalent respective distance from root. The instructions, when executed by the one or more processors, cause the one or more processors to perform operations for identifying a difference or discrepancy between elements of the first directory and elements of the second directory based on the comparison. In some implementations of the tangible computer readable, the instructions, when executed by the one or more processors, cause the one or more processors to perform operations for one or more additional signature comparisons. In some implementations, one or more signatures for each sub-directory of a directory in the first file hierarchy are compared to one or more signatures for corresponding parallel sub-directories of a parallel directory in the second file hierarchy.

BRIEF DESCRIPTION OF THE DRAWINGS

The above and related objects, features, and advantages of the present disclosure will be more fully understood by reference to the following detailed description, when taken in conjunction with the following figures, wherein:

FIGS. 4A-4C are illustrative string descriptors and signatures for the example file hierarchy of FIG. 3;

Like reference numbers and designations in the various drawings indicate like elements.

DETAILED DESCRIPTION

Implementations described generally relate to creating signatures for file hierarchies. These signatures have a variety of uses including, as described herein, using the signatures to identify similarities and/or differences between potentially redundant or similar file hierarchies.

Generally, two files may be compared by stepping through them one bit at a time, or one block of bits at a time, until two bits, or two blocks of bits, fail to match. If all the bits match, the files are equivalent. Comparing large files or comparing a large number of files using this process can be time consuming. The process may be accelerated by generating a signature for each file that is unlikely to be produced by a non-matching file. For example, the binary data of a file may be treated as an input value to a hash function and the resulting hash value may be used as a signature for the file. Hash functions typically produce an output of fixed size regardless of the input size and always produce the same output for the same input. If two files have different signatures (e.g., different hash values) then the two files are themselves different. Typically, hash functions are chosen such that minor changes to the file will result in a very different hash value. Thus, where the hash function is well selected, it is unlikely that two non-equivalent files of the same size will have the same signature. However, generating the hash value of a file requires processing the entire file.

As described in more detail herein, signatures may be efficiently generated for sets of files. A signature for a first set of files may be compared to a signature for a second set of files. If the two signatures match, it is likely that the sets of files are equivalent. Further analysis can confirm the equivalence, if required. In some implementations, the signatures are small fixed size values that are used to compress representation of highly redundant data sets.

Figure 1:
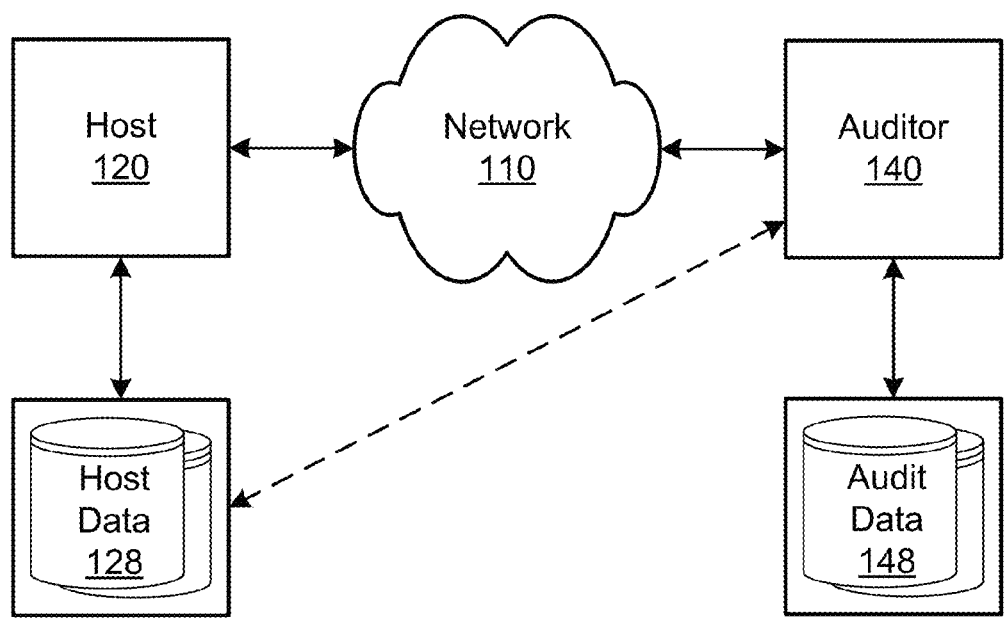
FIG. 1 is a block diagram of an implementation of a system configuration consistent with the disclosed methods and systems.

FIG. 1 is a block diagram of an implementation of a system configuration consistent with the disclosed methods and systems. Illustrated is a network 110 facilitating communication between a host computing system 120 and an auditor 140. The host computing system 120 stores files in a host data storage system 128. The files are analyzed by the auditor 140. The auditor 140 stores data for use in the audit in an audit data storage system 148.

Although illustrated as distinct computing systems and storage systems, the host computing system 120 may include the host data storage system 128 and the auditor 140 may include the audit storage system 148. Furthermore, the host computing system 120 may include the auditor 140, such that the network 110 might not be used.

Figure 2:
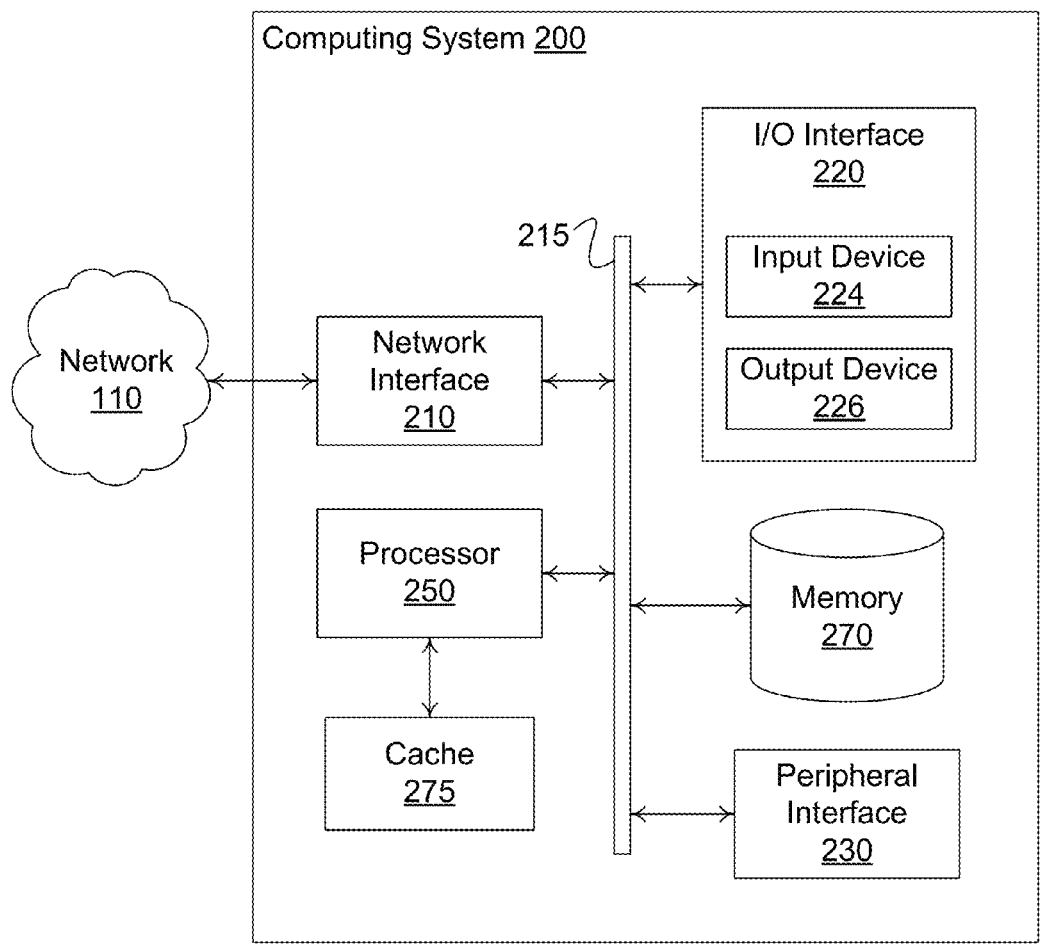
FIG. 2 is a block diagram of a computing system in accordance with an illustrative implementation.

Generally, a host computing device 120 is used to manage or access the set of files to be analyzed, e.g., in a host data storage system 128. The host computing device 120 may be a computing device or software executing on a computing device. The host computing device 120 may be virtualized. The host computing device 120 may be cloud-based. The host computing device 120 may be multiple computing devices working collaboratively. Illustrative examples of a host computing device 120 include, but are not limited to, a laptop, desktop, tablet, electronic pad, personal digital assistant, smart phone, video game device, television, kiosk, or portable computer. FIG. 2, described below, illustrates a computing device 200 that may be used as a host computing device 120.

Figure 3:
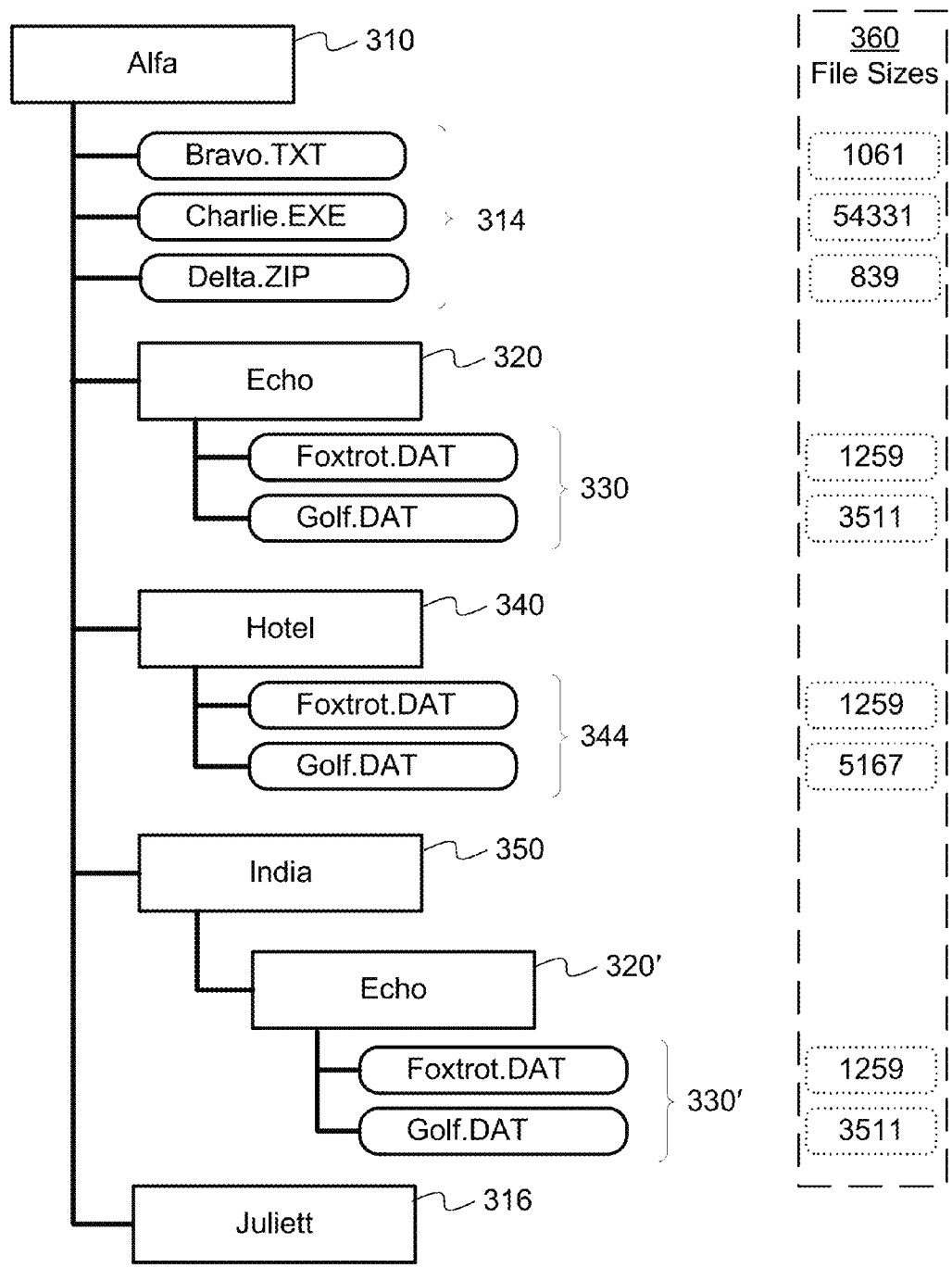
FIG. 3 is a block diagram of an illustrative example file hierarchy.

Generally, an auditor 140 is used to analyze or scan the set of files managed by the host computing device 120. The auditor 140 may be a computing device or software executing on a computing device. The auditor 140 may be virtualized. The auditor 140 may be cloud-based. The auditor 140 may be multiple computing devices working collaboratively. In some implementations, the auditor 140 scans files stored by the host computing device 120 and stores information about the directories and files of the file hierarchy. The scan information may be stored in an audit data storage device 148. In some implementations, the auditor 140 compares files stored by the host computing device 120 to other files stored by the host computing device 120. In some implementations, the auditor 140 compares files stored by the host computing device 120 to files previously analyzed or reviewed by an auditor 140. These files, or signatures for these files, may be stored by an audit data storage device 148. In some implementations, the auditor 140 compares files stored by the host computing device 120 to files stored by a second host computing device (not illustrated), either concurrently or by use of data stored in an audit data storage device 148. The auditor 140 may be distinct from the host computing device 120 or implemented as part of the host computing device 120. FIG. 2, described below, illustrates a computing device 200 that may be used as an auditor 140. FIG. 3, described below, illustrates a file hierarchy that might be scanned or analyzed and FIGS. 4A-4C, described below, illustrate some of the signatures and string descriptors (signatures "in the clear") that can be generated by the auditor 140.

The network 110 is a network facilitating the interactions between computing devices, e.g., between a host computing device 120 and an auditor 140. An illustrative network 110 is the Internet; however, other networks may be used. The network 110 may also be described as a data network or as a communication network and may be composed of multiple connected sub-networks. The network 110 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. The network 110 may be any type and/or form of network and may include any of a point-to-point network, a broadcast network, a wide area network, a local area network, a telecommunications network, a data communication network, a computer network, an asynchronous transfer mode (ATM) network, a synchronous optical network (SONET), a wireless network, an optical fiber network, and a wired network. In some embodiments, there are multiple networks 110 between computing devices. The network 110 may be public, private, or a combination of public and private networks. The topology of the network 110 may be a bus, star, ring, or any other network topology capable of the operations described herein. The network 110 can be used for communication between a host computing device 120 and an auditor 140.

As described, the host computing device 120 stores the files in a host data storage system 128. The host data storage system 128 may use internal data storage devices, external local data storage devices, and/or networked data storage devices. Likewise, the auditor 140 stores information in an audit data storage system 148. The audit data storage system 148 may use internal data storage devices, external local data storage devices, and/or networked data storage devices. Data storage devices may be volatile or non-volatile storage, hard drives, network attached storage, or storage area networks. Data storage devices may incorporate one or more mass storage devices for storing data, e.g., magnetic, magneto optical disks, or optical disks. Devices suitable for storing data include all forms of non-volatile memory, media and memory devices, including by way of example semiconductor memory devices, e.g., EPROM, EEPROM, and flash memory devices, magnetic disks, e.g., internal hard disks or removable disks, magneto optical disks, and CD ROM, DVD-ROM, and Blu Ray disks. Data storage devices may be virtualized. Data storage devices may be accessed via an intermediary server and/or via a network 110. Data storage devices may structure data as a database, e.g., as a relational database. Data storage devices may structure data as a collection of files, data blocks, or chunks. Data storage devices may provide for error recovery using, for example, redundant storage and/or error recovery data (e.g., parity bits).

FIG. 2 is a block diagram of a computing system 200 suitable for use in implementing the computerized components described herein. The essential elements of a computing system are a processor for performing actions in accordance with instructions and one or more memory devices for storing instructions and data. The illustrative computer system 200 includes one or more processors 250 in communication, via a bus 215, with an optional network interface 210 (in communication with the network 110), optional I/O interfaces 220 (e.g., for interacting with a user or administrator), and memory 270. Generally, a processor 250 will receive instructions and data from a read only memory or a random access memory or both. The processor 250 illustrated incorporates, or is directly connected to, additional cache memory 275. In some uses, additional components are in communication with the computer system 200 via a peripheral interface 230. In some uses, such as in a server context, there is no I/O interface 220 or the I/O interface 220 is not used. In some uses, the I/O interface 220 supports an input device 224 and/or an output device 226. In some uses, the input device 224 and the output device 226 are integrated into the same hardware, for example, as in a touch screen.

The processor 250 may be any logic circuitry that processes instructions, e.g., instructions fetched from the memory 270 or cache 275. In many embodiments, the processor 250 is a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 200 may be based on any of these processors, or any other processor capable of operating as described herein. The processor 250 may be a single core or multi-core processor. The processor 250 may be multiple processors.

The I/O interface 220 may support a wide variety of devices. Examples of an input device 224 include a keyboard, mouse, touch or track pad, trackball, microphone, touch screen, or drawing tablet. Examples of an output device 226 include a video display, television, touch screen, speaker, braille terminal, printer, or 3D printer. In some implementations, an input device 224 and/or output device 226 may function as a peripheral device connected via a peripheral interface 230.

A peripheral interface 230 supports connection of additional peripheral devices to the computing system 200. The peripheral devices may be connected physically, e.g., via FireWire or universal serial bus (USB), or wirelessly, e.g., via Bluetooth. Examples of peripherals include keyboards, pointing devices, display devices, braille terminals, audio devices, hubs, printers, media reading devices, storage devices, hardware accelerators, sound processors, graphics processors, antennae, signal receivers, sensors, measurement devices, and data conversion devices. In some uses, peripherals include a network interface and connect with the computer system 200 via the network 110 and the network interface 210. For example, a printing device may be a network accessible printer.

The computer system 200 can be any workstation, desktop computer, laptop or notebook computer, server, blade, handheld computer, tablet, mobile telephone or other portable telecommunication device, media playing device, a gaming system, mobile computing device, or any other type and/or form of computing, telecommunications or media device that has sufficient processor power and memory capacity to perform the operations described herein. For example, the computer system 200 may comprise a tablet device such as one of the Nexus family of devices manufactured by Google Inc. of Mountain View, Calif. or one of the iPad family of devices manufactured by Apple Computer of Cupertino, Calif.

Implementations of the subject matter and the operations described herein can be implemented in digital electronic circuitry, or in computer software embodied on a tangible medium, firmware, or hardware, including the structures disclosed herein and their structural equivalents, or in combinations of one or more of them. Implementations of the subject matter described herein can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory. The operations described in this specification can be implemented as operations performed by a data processing apparatus on data stored on one or more computer-readable storage devices or received from other sources.

Different computing systems may implement slightly different file systems. Some file systems refer to directories as folders. Some file systems treat directories as though they were files. Some file systems include special sub-directories in a directory, e.g., a sub-directory pointing to the directory's parent (e.g., in Microsoft systems this is the " . . . " directory). Generally, special directories of this nature are omitted from string descriptors and signatures. Some file systems treat archival files (e.g., ZIP files) as directories. The metadata available in a file system varies. For the purposes described herein, consistent treatment of directories can avoid complications of working with different file systems.

FIG. 3 is a block diagram of an example file hierarchy for purposes of illustration. A parent directory 310 is illustrated as a root node for various files 314, 330, 344, 330', and sub-directories 320, 340, 350, 320', 316. A table of files sizes 360 is also illustrated, with each file size on the right corresponding to the file illustrated to the left.

The parent directory 310 is labeled "Alfa" as an example directory name. The Alfa directory 310 includes three files 314 and four sub-directories 320,340,350, 316. The sub-directories may be recursively expanded, e.g., revealing that sub-directory India 350 includes a deeper sub-directory Echo 320'. The parent directory 310 illustrated may be a root node for the file system or may itself be a sub-directory of a grand-parent directory not illustrated.

The various files 314, 330, 344, 330', may be empty or may contain data. The files are labeled with various example file names that include extensions, although no such extensions are required and those illustrated are merely included as examples. The files are also assigned sizes in a table 360 on the right-hand side of FIG. 3. The files are named and sized merely for illustrative purposes and the labels are used in the example string descriptors shown in FIGS. 4A-4C.

The various directories 310, 320, 340, 350, 320', 316, may be empty, may contain data, and may contain sub-directories. Directory Juliett 316, for example, is illustrated with no files therein. Directory India 350, for example, is illustrated with a sub-directory Echo 320' therein. The root directory, Alfa 310, is a parent directory for each of the first tier directories, 320, 340, 350, 316, and a grand-parent directory for deeper tier directories, e.g., Echo 320'. The directories are labeled with various example directory names. The directories are not illustrated with sizes. The sizes in the table 360 on the right-hand side of FIG. 3 correspond to the files illustrated. The directories are named merely for illustrative purposes and the labels are used in the example string descriptors shown in FIGS. 4A-4C.

The files and directories illustrated are labeled as follows: The files 314 in directory Alfa 310 are labeled Bravo.TXT (size 1061), Charlie.EXE (size 54331), and Delta.ZIP (size 839); the files 330 in directory Echo 320 are labeled Foxtrot.DAT (size 1259) and Golf.DAT (size 3511); the files 344 in directory Hotel 340 are labeled Foxtrot.DAT (size 1259) and Golf.DAT (size 5167); the files 330' in directory Echo 320', illustrated as a sub-directory of directory India 350, are labeled Foxtrot.DAT (size 1259) and Golf.DAT (size 3511); and no files are illustrated in directory Juliet 316.

The table of files sizes 360 lists a number for each file where the number represents the size of the file to the immediate left in FIG. 3. Because FIG. 3 is merely an illustrative diagram of a file hierarchy, these file sizes do not have units. In some implementations, the file size unit is consistent throughout the implementation and therefore need not be specified. In some implementations, file size units specified explicitly. Generally, file sizes may be measured in units of bytes, kilobytes, megabytes, or any other unit of file size. In some embodiments, file sizes are measured with the best precision consistently available. In some embodiments, file sizes are consistently measured in bytes. The directories illustrated in FIG. 3 have not been assigned sizes; where directory sizes are used, the sum of the file sizes contained therein is used.

Generally, metadata and descriptive information about each directory and/or file may be identified. The identified information may include one or more of: sub-directory name, sub-directory size, number of files and/or sub-directories within a directory, file name, file size, security attributes, and archival status. File or directory names may be full form and/or truncated to so-called "short" form (e.g., the 8.3 format historically used in older operating systems like MS DOS). File names can be normalized to lower-case or upper-case. The descriptive information may include date and time information including creation date, last modified date, and/or last accessed date. Various metadata may be used as descriptive information. The descriptive information may be stored as metadata. In the implementations illustrated, only the sub-directory names, file names, and file sizes are shown; however, other implementations can make use of the various additional descriptive information described here. The descriptive information may be persistently stored in a database, e.g., at an audit data storage system 148. The descriptive information may be used to form signatures and then discarded. In some implementations, some of the information gathered is retained while other information is discarded. Storage of descriptive information is described in more detail below, in reference to storing signatures.

A file hierarchy can be described using one or more string descriptors representing metadata or descriptive information about the files in a directory. The term "signature" is generally used herein to indicate a digest or hash version of a string descriptor, as described below. However, the string descriptor itself is also a signature "in the clear" for the directory. Generally, as described herein, multiple string descriptors are created for the same directory within a file hierarchy, with each string descriptor representing a different granularity of descriptive information for the particular directory. Each directory in a hierarchy is scanned, resulting in a plurality of signatures. The digests or hashes for each of the multiple string descriptors are the multiple signatures associated with the file hierarchy. The following table (Table 1) provides illustrative string descriptor combinations as examples:

TABLE 1

| Nickname | Element Selection Criteria | Element Descriptor Components | Element Descriptor Format | String Descriptor Format |
|---|---|---|---|---|
| Signature Types: | | | | |
| "Deep with Size" | Every data file, archive file, and subdirectory, with each subdirectory recursively expanded; i.e.: ** **/* | Data File: Name & Size Archive: Name & Size Directory: Name & String Descriptor | Data File: @Name:Size@ Archive: @Name:Size@ Directory: Name>String Descriptor< Empty Directory: Name>< | Concatenate element descriptors alphanumerically by name within each directory. |
| "Deep No Size" | Every data file, archive file, and subdirectory, with each subdirectory recursively expanded; i.e.: ** **/* | Data File: Name Archive: Name Directory: Name & String Descriptor | Data File: @Name@ Archive: @Name@ Directory: Name>String Descriptor< Empty Directory: Name>< | Concatenate element descriptors alphanumerically by name within each directory. |
| "Shallow with Size" | Every data file, archive file, and subdirectory, without expanding any subdirectories; i.e.: ** **/* | Data File: Name & Size Archive: Name & Size Directory: Name | Data File: @Name:Size@ Archive: @Name:Size@ Directory: Name>< | Concatenate element descriptors alphanumerically by name. |
| "Shallow No Size" | Every data file, archive file, and subdirectory, without expanding any subdirectories; i.e.: ** **/* | Data File: Name Archive: Name Directory: Name | Data File: @Name@ Archive: @Name@ Directory: Name>< | Concatenate element descriptors alphanumerically by name. |
| "Structure Only" or "Deep Structure" | Every subdirectory, with each subdirectory recursively expanded; i.e.: **/* | Data File: N/A Archive: N/A Directory: Name & "Structure Only" String Descriptor | Data File: N/A Archive: N/A Directory: Name>String Descriptor< Empty Directory: Name>< | Concatenate directory descriptors alphanumerically by name within each directory. |
| "Shallow Structure" | Every subdirectory, with each subdirectory recursively expanded do a depth N (default of N = 1); i.e.: **/* | Data File: N/A Archive: N/A Directory: Name & "Structure Only" String Descriptor up to N levels deep | Data File: N/A Archive: N/A Directory: Name>String Descriptor< $N^{th}$ Directory: Name>< Empty Directory: Name>< | Concatenate directory descriptors alphanumerically by name within each directory. |
| "Constellation" | Element selection and Element Descriptor Components are Configurable. (See Table 2) Element Size is optional. | | Data File: @Name:Size@ or @Name@ Archive: @Name:Size@ or @Name@ Directory: Name>String Descriptor< Empty Directory: Name>< | Concatenate element descriptors alphanumerically by name within each directory. |

Table 1 shows six types of signatures, which are referenced throughout this description by the nicknames indicated. Shown are "Deep with Size," "Deep no Size," "Shallow with Size," "Shallow no Size," "Structure Only," "Shallow Structure," and "Constellation." For each type, Table 1 shows the Element Selection Criteria for determining which elements from a scanned directory to include in the signature. Table 1 shows the element descriptor components used to describe the selected elements (i.e., the elements that satisfied the selection criteria) and the element descriptor format used to represent the element descriptor components. The element descriptor components may be specified in an element descriptor component list for elements of each type (e.g., data file, archive file, or directory); the element descriptor component list may be specified in a configuration setting or file. In some implementations, there is a single "file" type for data files and archive files. In some implementations, there are separate types for data files and for archive files. In some implementations, there are more specific types distinguishing between types of data files, e.g., image files, text files, media files, etc. The format rules may be specified in a configuration setting or file. The format rules shown are not meant to be limiting and are merely an example; any consistent format can be used. The element descriptor components are concatenated in a deterministic ordering to form a string descriptor, which is the signature in the clear.

The "Deep with Size," "Deep no Size," and "Structure Only" signatures shown in Table 1 represent recursively specialized for Java packages. Use of these Constellation signature rules results in the same signature for a Java source code tree and for a compiled Java package. An example using and illustrating this type of Constellation signature is presented in more detail below, in reference to FIG. 4D.

TABLE 2

Example Constellation Rules (Java Example):

| Nickname | Element Selection Criteria | Element descriptor components | Element Descriptor Format | String Descriptor Format |
|---|---|---|---|---|
| "Java Constellation" | Every data file with a ".java" or ".class" file extension, unless the file has a dollar sign ("$") in the name, and subdirectories, with each subdirectory recursively expanded; i.e.: \*\*/\* java, \*\*/\*.class, excluding \*\*/\*\\$\*.class | Data File: Name minus file extension Archive: N/A Directory: Name & String Descriptor | Data File: @Name@ (with the extension removed) Archive: N/A Directory: Name>String Descriptor< Empty Directory: Name>< | Concatenate element descriptors alphanumerically by name within each directory. | expanded subdirectories. Each subdirectory is scanned and represented in the respective signature using the signature's rules. In the "Deep with Size" and "Deep no Size" signatures the data files and archive files in each directory are named and, in the "Deep with Size" signature, the respective file size is indicated. In some implementations, at any level of a file hierarchy tree, the contents of a sub-directory may be represented in the string descriptor as a signature for the sub-directory. In some implementations, the subdirectory signatures are represented in the string descriptor in hash or digest form. In some implementations, in some signatures, an archive file is treated as a subdirectory and any directories within the archive file are expanded.

The "Shallow with Size" and "Shallow no Size" signatures shown in Table 1 represent only a single directory. Subdirectories are named, but the contents are not represented in the respective shallow signature. The data files and archive files in the directory are named and, in a "Shallow with Size" signature, the respective file size is indicated.

In some implementations, a controlled-depth signature (e.g., "Shallow Structure") is used in which the subdirectories for a Shallow signature are expand up to a predetermined depth. That is, a "Controlled with Size" or "Controlled no Size" (not shown in Table 1) expands subdirectories nested up to N directories deep. In some implementations, the subdirectory signatures are represented in the string descriptor in hash or digest form. In some implementations, an archive file is treated as a subdirectory and any directories within the archive file are expanded.

The "Constellation" signatures shown in Table 1 allow for specialized configurable signatures. In some implementations, an interface or control file allows for specific control over the inclusion or exclusion of directories and files in a string descriptor, e.g., in a Constellation signature. In some implementations, rules specifying one or more Constellation signature types are stored in a configuration file. Table 2, below, shows example rules for a Constellation signature The term "signature" is generally used herein to indicate a digest or hash version of a string descriptor. Each string descriptor type, e.g., as described in Table 1 above, is a signature "in the clear" for the directory scanned and a signature is generated by taking a digest or hash of the string descriptor. This is a digest or hash of select file metadata (as specified by the element descriptor component list), not the actual binary content of the file. Signatures may be produced, for example, by calculating a Cyclic Redundancy Check (CRC) value, computing a Message-Digest such as MD5 (see, e.g., RFC 1321), calculating a cryptographic hash such as a Secure Hash Algorithm (e.g., SHA-1, SHA-2, etc.), or calculating a non-cryptographic hash such as any of the CityHash functions (e.g., CityHash128) or MurmurHash3. In the examples used herein, signatures are illustrated as the 512 bits of an MD5 digest written out in hexadecimal notation. However, any digest or hash with reasonably low collision rates may be used.

Figure 4B:
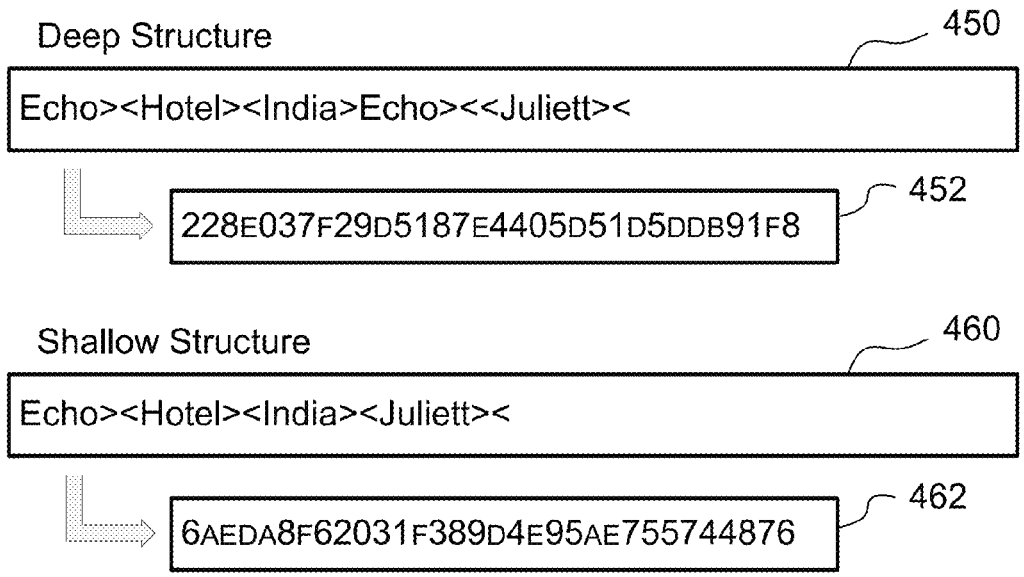
Figure 4C:
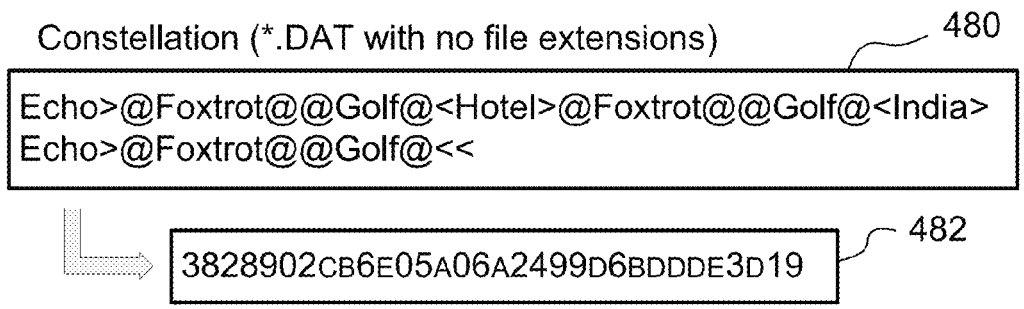
Figure 4D:
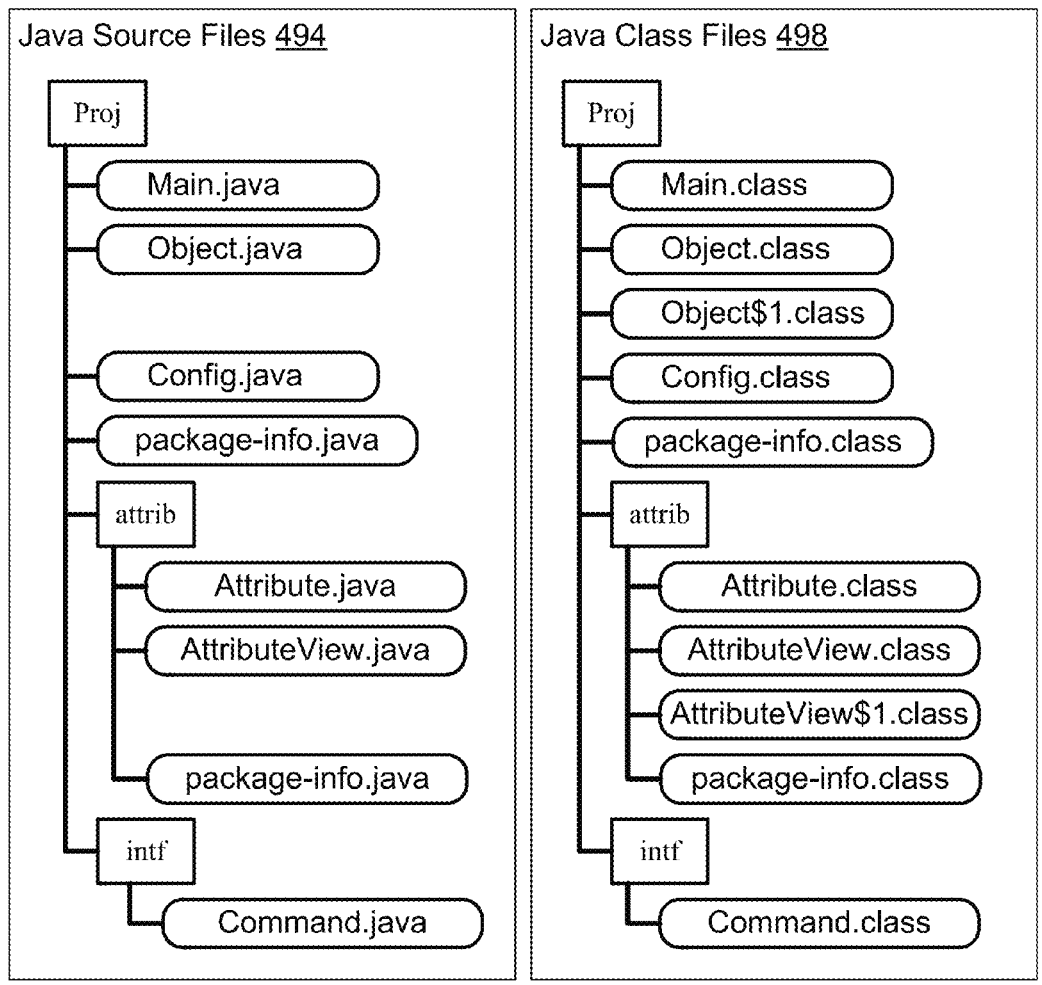
FIG. 4D is an illustration of a Java Constellation string descriptor and signature.

FIGS. 4A-4C illustrate various examples of string descriptors and signatures for the file hierarchy illustrated in FIG. 3. FIG. 4D illustrates an example string descriptor and signature for two other example file hierarchies. In some implementations, one or more symbols are used as separators and to denote directory depth, e.g., using commas, semicolons, parentheses, and/or slash marks. In some implementations, string descriptor formatting rules contain symbols both to represent delimiters for appending element descriptors together as well as to indicate levels of nesting depth.

In FIGS. 4A-4D, the string descriptor are illustrated using element descriptor format rules as follows: File names for data files and archive files are joined with file size using a colon (":"); the file name and file size pair (or just the file name when sizes are omitted) are bounded by at symbols ("@", also called the commercial at symbol); a sub-directory name is followed by a greater-than sign (">") and a list of element descriptors for the contents of the sub-directory, the list terminated by a less-than sign ("<"). These element descriptor format rules mirror the example rules shown in Table 1, above. Any consistent set of element descriptor format rules may be used.

FIG. 4A illustrates a "Deep with Size" string descriptor 410 representing the file hierarchy illustrated in FIG. 3 using the Alfa directory 310 as a root node. The signature type "Deep with Size" is described above in Table 1 and, in some implementations, is defined by specific element selection criteria, an element descriptor component list, and formatting rules for each element descriptor and for aggregating the element descriptors into a "Deep with Size" string descriptor representative of the file hierarchy for a particular root. As indicated in Table 1, each file is named and the respective file size appended. Each sub-directory is recursively expanded. In some implementations, sizes are associated with directories and files. In some implementations, sizes are associated only with files, as illustrated. In some implementations, rules defining an element descriptor component list for each element type indicate if an element type is represented with a name, a name and size, or some other set of element descriptor components. An example signature for the string descriptor 410 is an MD5 digest 412 of the descriptor. In some implementations, the signature 412 and/or the string descriptor in the clear 410 is stored, e.g., in a database at an audit data storage system 148.

FIG. 4A further illustrates a "Deep no Size" string descriptor 420 representing the file hierarchy illustrated in FIG. 3, using the Alfa directory 310 as a root node. The signature type "Deep no Size" is described above in Table 1 and, in some implementations, is defined by specific element selection criteria, an element descriptor component list (different from the "Deep with Size," e.g., omitting size information), and formatting rules for each element descriptor and for aggregating the element descriptors into a "Deep no Size" string descriptor representative of the file hierarchy for a particular root. As shown in Table 1, each file is named and the respective file sizes are omitted. An example signature for the string descriptor 420 is an MD5 digest 422 of the descriptor. The "Deep no Size" signature 422 differs from the "Deep with Size" signature 412 because the file sizes have been omitted from the "Deep no Size" string descriptor 420. Thus both the "Deep no Size" signature 422 and the "Deep with Size" signature 412 are representative of the file hierarchy illustrated in FIG. 3, although with different levels of specificity. In some implementations, the signature 422 and/or the string descriptor in the clear 420 is stored, e.g., in a database at an audit data storage system 148.

FIG. 4A further illustrates a "Shallow with Size" string descriptor 430 representing the file hierarchy illustrated in FIG. 3, using the Alfa directory 310 as a root node. The signature type "Shallow with Size" is described above in Table 1 and, in some implementations, is defined by specific element selection criteria (differing from "Deep with Size," for example, by not selecting contents of sub-directories), an element descriptor component list, and formatting rules for each element descriptor and for aggregating the element descriptors into a "Shallow with Size" string descriptor representative of a particular root directory. Each file is named and the respective file size appended. Each sub-directory is named, but not expanded. An example signature for the string descriptor 430 is an MD5 digest 432 of the descriptor. In some implementations, the signature 432 and/or the string descriptor in the clear 430 is stored, e.g., in a database at an audit data storage system 148.

FIG. 4A further illustrates a "Shallow no Size" string descriptor 440 representing the file hierarchy illustrated in FIG. 3, using the Alfa directory 310 as a root node. The signature type "Shallow no Size" is described above in Table 1 and, in some implementations, is defined by specific element selection criteria, an element descriptor component list (different from the "Shallow with Size," e.g., omitting size information), and formatting rules for each element descriptor and for aggregating the element descriptors into a "Shallow no Size" string descriptor representative of a particular root directory. Each file is named and each sub-directory is named, but the sub-directories are not expanded and file sizes are omitted. An example signature for the string descriptor 440 is an MD5 digest 442 of the descriptor. In some implementations, the signature 442 and/or the string descriptor in the clear 440 is stored, e.g., in a database at an audit data storage system 148.

FIG. 4B illustrates a "Deep Structure" string descriptor 450 representing the file hierarchy illustrated in FIG. 3, using the Alfa directory 310 as a root node. The signature type "Deep Structure" is described above in Table 1 and, in some implementations, is defined by specific element selection criteria (e.g., only directory names), an element descriptor component list, and formatting rules for each element descriptor and for aggregating the element descriptors into a "Structure" string descriptor representative of the directory hierarchy from a particular root. Only the names of sub-directories within the Alfa directory 310 are included, recursively expanding sub-directories. An example signature for the string descriptor 450 is an MD5 digest 452 of the descriptor. In some implementations, the signature 452 and/or the string descriptor in the clear 450 is stored, e.g., in a database at an audit data storage system 148.

FIG. 4B further illustrates a "Shallow Structure" string descriptor 460 representing the file hierarchy illustrated in FIG. 3, using the Alfa directory 310 as a root node. The signature type "Shallow Structure" is described above in Table 1 and, in some implementations, is defined by specific element selection criteria (e.g., only directory names to a depth N), an element descriptor component list, and formatting rules for each element descriptor and for aggregating the element descriptors into a "Structure" string descriptor representative of the directory hierarchy from a particular root. A shallow structure string descriptor is limited to a depth of N tiers of subdirectories. The string descriptor 460 is for a depth of N=1, such that only the names of first tier sub-directories within the Alfa directory 310 are included. The sub-directories are not expanded. An example signature for the string descriptor 460 is an MD5 digest 462 of the descriptor. In some implementations, the signature 462 and/or the string descriptor in the clear 460 is stored, e.g., in a database at an audit data storage system 148. Because the example hierarchy illustrated in FIG. 3 only has a depth of two levels, a "Shallow Structure" string descriptor with a depth of N=2 is the "Deep Structure" string descriptor 450. A depth of N=0 is the root node.

In some implementations, element selection criteria for a string descriptor type may be defined by "include" and/or "exclude" rules, e.g., as one or more regular expressions or filters specifying criteria for inclusion or exclusion of elements. For example, an inclusion rule may specify that only file names satisfying a glob pattern or regular expression are to be included in the string descriptor. The regular expression may be expressed using a particular grammar or standard (e.g., Posix or Perl). Any of the string descriptors described may be configured to exclude files, e.g., to exclude file-system specific files, to exclude document management or revision control files such as Git files, or to exclude temporary or auto-save files. These criteria rules may be expressed in a configuration and/or stored in a control file.

In some implementations, element attributes or metadata to be used in the string descriptor may be specified as element descriptor components, e.g., in an element descriptor component list. Each signature type may be associated with a different element descriptor component list (e.g., some with size and some without size). The representation of each element descriptor component may be controlled by formatting rules, e.g., by a masking rule that controls how much of a file name or directory name to include. For example, a masking rule may be used to remove file extensions from a string descriptor for a data file or an archive file. In some implementations, a masking rule is a regular expression-based text substitution. The element descriptor component lists and formatting rules may be expressed in a configuration and/or stored in a control file.

A string descriptor can be created according to a set of configurable criteria; this type of string descriptor or signature is referred to herein as a "Constellation." The Constellation signature types are introduced above, in Table 1 and in Table 2. A first example is illustrated in FIG. 4C and a Java Constellation example is illustrated in FIG. 4D.

FIG. 4C illustrates a "Constellation" string descriptor, which include only files matching a set of configurable criteria. A "Constellation" string descriptor 480, and example signature 482, is illustrated for criteria to only include files with a "DAT" extension and to not include the file extension (the ".DAT"). In some implementations, the configuration for a constellation string descriptor is stored by an audit data storage system 148. In some implementations, the configuration for a constellation string descriptor is stored as a configuration file. In some implementations, the configuration for a constellation string descriptor is stored in a database. In some implementations, the configuration for a constellation string descriptor is accessed via an application programming interface (API). In some implementations, the configuration for a constellation string descriptor is accessed via a user interface (UI).

FIG. 4D illustrates a "Java Constellation" string descriptor, which include only files matching the set of configurable criteria as specified in Table 2, above. A "Java Constellation" string descriptor 490, and example signature 492, is illustrated representing two distinct file hierarchies 494 and 498. One file hierarchy is a source code tree 494 with example java source code files. A java compiler can compile the source code files 494 into byte code for execution in a Java Virtual Machine; the compiler will create class files as shown in the second file hierarchy 498. The two sets of files 494 and 498 are different files, but they are closely related. The second set of files 498 are java class files created from the java source code files in the first set of files 494. A Java Constellation string descriptor 490 can be created by applying the element selection criteria in the Java Constellation signature described by Table 2, above, to the root directory of the source files 494. The same Java Constellation string descriptor 490 can be created by applying the element selection criteria in the Java Constellation signature described by Table 2, above, to the root directory of the compiled class files 498. Thus the single signature 492, created from the string descriptor 490, is representative of both the source files 494 and the compiled class files 498. The signature is small and compact, particularly in comparison to the file hierarchies. A signature 492 representative of the source files 494 can be quickly and easily compared to a signature 492 representative of the compiled class files 498. The fact that the two file hierarchies 494 and 498 have matching Java Constellation signatures demonstrates the relationship between the two file hierarchies 494 and 498.

Generally, string descriptors and signatures represent a file hierarchy, or a portion of a file hierarchy, as a characterization of metadata for the hierarchy's contents. The string descriptors and signatures presented in Tables 1 and 2 do not represent the actual binary contents of elements. A file's name and size may be the same before and after a change to the file's contents. A more precise signature can be created that also represents the actual binary contents of an element. For example, a signature may be created using the rules shown in Table 3, below.

TABLE 3

Deep Binary Signatures:

| Nickname | Element Selection Criteria | Element Descriptor Components | Element Descriptor Format | String Descriptor Format |
|---|---|---|---|---|
| "Deep Binary" | Every data file, archive file, and subdirectory, with each subdirectory recursively expanded; i.e.: ** **/* | Data File: Binary Hash Archive: Binary Hash Directory: Name & String Descriptor | Data File: #hashvalue# Archive: #hashvalue# Directory: Name>String Descriptor< Empty Directory: Name> < | Concatenate element descriptors alphanumerically within each directory. |

In some implementations, a "Deep Binary" signature is created according to the rules shown in Table 3, above. The "Deep Binary" signature is an aggregation of hash or digest values for each element in a file hierarchy. Although each hash or digest value has some probability of collision (where two different input values result in the same hash or digest value), it is almost a certainty that if a scan of a real file hierarchy produced a Deep Binary signature equal to a Deep Binary signature for another file hierarchy, then the two file hierarchies are equivalent. The probability of a false positive for this type of comparison is substantially close to zero. In some implementations, Deep Binary signatures are not used either because this level of precision is not needed or desired or because the additional processing time is undesirable. In some implementations, Deep Binary signatures are used in special circumstances, such as to record confirmation of equivalence between two scanned file hierarchies.

As described above, each of the string descriptors and signatures described in Tables 1-3 and illustrated by example in FIGS. 4A-4D may be stored in association with descriptive information about a file hierarchy. For example, referring to FIG. 1, an auditor 140 may record information about directories and files controlled by a host system 120 in an audit data storage system 148 or in an archive file. The information stored may include data about each directory in the file hierarchy, e.g., directory name, number of files, distance from root, and/or other metadata. The information stored generally includes one or more of the signatures (e.g., in hash or digest form) of the types described in Tables 1-3. In some implementations, the information stored also includes one or more string descriptors (a signature "in the clear"). Table 4, below, lists examples of properties that can be stored, e.g., in one or more database tables, for information about directory elements. The information stored may include data about each file in a file hierarchy rooted at the directory, e.g., file name, size, and/or other metadata. In some implementations, a signature or hash of a file's binary data is also stored, in addition to the signatures introduced above. Table 5, below, lists examples of properties that can be stored, e.g., in one or more database tables, for information about file elements.

Table 4, below, lists examples of properties that can be stored, e.g., in one or more database tables, for information about directory elements such as directories and archive files.

TABLE 4

Examples of Properties for Directory Elements:

| Property | Description |
|---|---|
| Scan ID | Identifier for the scan cataloging this directory |
| Element Name | Directory name |
| Element Path | Path, from scan root, to the directory |
| Parent ID | Identifier for the parent directory for this directory (if there is one) |
| Distance From Root | Distance from the root parent directory, zero means this is the root. |
| Shallow File Count | Number of files in this directory |
| Deep File Count | Number of files in this directory and any sub-directories |
| Signature (Type 1) | The signature for this element of the specified type (see Table 1) |
| Signature (Type 2) | The signature for this element of the specified type (see Table 1) |
| Signature (Type N) | The signature for this element of the specified type (see Table 1) |
| Element Type | Value indicating an element type, e.g., directory, archive file, or data file |
| isArchive | Boolean value indicating if the directory is in an archive |
| Archive Element | Identifier for the archive file entry |

A "Scan ID" is an identifier for each particular scan traversing a file hierarchy, creating the signatures and cataloging the file and directory elements found, as described above. The scan begins at a root node (the directory being scanned). For each directory in the root node, the scan sorts the contents of the directory (the file names and sub-directory names) according to a deterministic sort, e.g., alphanumeric order. In some implementations the ordering is defined within string descriptor formatting rules. In a deep scan, sub-directories are explored recursively. In some implementations, the information stored includes an indicator of Element Type, e.g., whether the element is a directory, a data file, an archive file, or some other type of element. The indicator may be a text string, a typecast value, a number, or any other indicator distinguishing different element types.

A file hierarchy being scanned may be an archived set of files, e.g., files compressed into a ZIP file or bundled in a TAR file. In some implementations, the information stored may include a Boolean value ("isArchive") for a file hierarchy within an archive. In some implementations, a reference is recorded to the archive file itself (the "Archive Element"). When scanning a file hierarchy that includes an archive file, the archive file is treated as a file from the perspective of the directory in which it resides and then scanned separately as a new file hierarchy with its own root node internal to the archive. Thus the archive may be recorded both as a file element (as an archive file) and separately as a directory element. In some implementations, the contents of an archive are traversed while recursively expanding the directory where the archive file resides.

As a file hierarchy is scanned, each data file, archive file, and sub-directory is recorded as an element in the file hierarchy. The element's name (file name, archive name, or directory name) is recorded as an "Element Name" and, in some implementations, a path to the root node ("Element Path") is recorded. A directory's file count may be recorded as one or both of a count of the number of data files and archive files present in the directory ("Shallow File Count") and a count of the number of data files and archive files present in the directory and all sub-directories ("Deep File Count"). In some implementations, a directory's file count omits archive files. In some implementations, a directory's file count includes a count of sub-directories. In some implementations, a directory has an "Element Count" for the number of elements present in the directory or in the directory and sub-directories.

The first directory scanned is a root node for the directory tree. A "Distance from Root" property may be recorded for each directory indicating its separation from the first directory of the scan. The root directory itself has a distance of 0, an immediate sub-directory of the root has a distance of 1, sub-directories of those directories have a distance of 2, and so forth. Each directory may serve as a root directory for its sub-directories. A particular sub-directory may be chosen as a root node for a scan, e.g., where the directory is the parent of a logical grouping of files such as the root of a source code tree, a software installation package, or of an archive file. Where the directory is within an archive, a "DistanceFromInnerRoot" property may be recorded indicating the number of parent directories to reach the root directory of the archive. An archive file may be nested within another archive file (e.g., a tar.gz file containing a zip file containing a jar file). The inner root directory of an archive is the top root of the inner most archived directory (e.g., the root of the directories in the jar file). In some implementations, an attribute is recorded for an archived directory specifying the extent of nesting between the archived directory and the outermost archive file.

Information for each directory is stored in association with one or more signatures for the directory. As described above, in reference to Table 1, various string descriptors (signatures "in the clear") may be created for a directory and a digest or hash of the string descriptors may be created for use as a signature of the directory. In some implementations, only the digest or hash signatures are stored. In some implementations, a combinations of signatures in the clear and digest or hash signatures are stored. For example, in some implementations, each directory is stored in association with: a "Deep with Size" digest signature; a "Deep no Size" digest signature, a "Deep Structure" digest signature; a "Shallow with Size" string descriptor signature in the clear (depth N=1); a "Shallow with Size" digest signature (depth N=1); a "Shallow no Size" string descriptor signature in the clear (depth N=1); and a "Shallow no Size" digest signature (depth N=1). Each of these signatures (in the clear or in digest or hash form) can be used as a fingerprint for the file hierarchy rooted at the directory with which the signature is associated.

Each directory's parent directory is recorded ("Parent ID"). In some implementations, the parent directory is recorded as a key or unique identifier for the parent directory's entry in the data. In some implementations, a directory may be recorded as having multiple parents—where each of the multiple parent directories has an equivalent instance of the directory. For example, in some implementations, when entering a newly scanned directory into the data storage, a signature for the newly scanned directory may be compared to comparable signatures of the same type for previously scanned and stored directories. That is, a "Deep with Size" signature is compared with previously stored "Deep with Size" signatures. If there is a match, the existing entry is updated to include a reference to the parent of the newly scanned directory. This results in compression of the data storage for representation of file hierarchies. A highly redundant file hierarchy with many duplicate sub-directories may include smaller entries with internal references rather than repetition of entries for redundant file hierarchies.

The type of signature used in a comparison for compressing data storage has implications on the similarity or equivalence of hierarchies—using a "Deep Binary" signature (see Table 3, above) effectively ensures equivalence while using "Deep with Size" signatures (see Table 1, above) is less precise and using other signatures may only indicate a degree of similarity rather than a likelihood of equivalence. The degree of similarity implied by the selected signature type defines a degree of lossiness for compression of the storage. That is, where non-equivalent file hierarchies have matching signatures (e.g., matching "Structure Only" signatures), reliance on the signature match for compression will introduce some amount of information loss. Thus the type of signature used will determine a lossiness for compression of the data representing the file hierarchy. In some implementations, when a file hierarchy has a "Deep with Size" signature matching a "Deep with Size" signature in the data store, a Deep Binary signature is created and stored for use in confirming the equivalence.

Table 5, below, lists examples of properties that can be stored, e.g., in one or more database tables, for information about file elements such as data files and archive files.

TABLE 5

Examples of Properties for File Elements:

| Property | Description |
| --- | --- |
| Scan ID | Identifier for the scan cataloging this file |
| Element Name | File name |
| Element Path | Path, from scan root, to the file |
| Parent ID | Identifier for the parent directory for this file |
| Distance From Root | Distance from the root parent directory, zero means parent is the root. |
| File Size | If element is a file, size of the file |
| Element Type | Value indicating an element type, e.g., directory, archive file, or data file |
| isArchive | Boolean value indicating if the file is an archive |

As described above, a "Scan ID" is an identifier for each particular scan traversing a file hierarchy. For each directory element (e.g., sub-directory or archive file) identified during the scan, a record may be created and stored as described above. For each file element (e.g., data file or archive file) identified during the scan, a record may be created and stored. Properties of the identified file that may be recorded include, as indicated in Table 4, any combination of: the "Scan ID"; the file name ("Element Name"); a path to the file from the root directory ("Element Path"); an identifier for the directory in which the file resides ("Parent ID"), which may be a identifier or key to an entry for the parent directory; a number of directories separating the file from the root node ("Distance From Root"), and a size of the file ("File Size"). In some implementations, the information stored includes an indicator of Element Type, e.g., whether the element is a directory, a data file, an archive file, or some other type of element. The indicator may be a text string, a typecast value, a number, or any other indicator distinguishing different element types. In some implementations, the information stored for a file element may include a Boolean value ("isArchive") indicating whether or not the file is itself an archive of a file or file hierarchy, e.g., if the file is a ZIP file or a TAR file. In some implementations, a digest or hash of the binary contents of the file is also recorded, although this is distinct from the signatures described above in reference to Tables 1 and 2.

The scan data may be stored in a compact manner. Some files or groups of files may be repeated within a file hierarchy with little or no change. Some files or groups of files may be seen by an auditor in multiple hosts or during multiple scans. FIG. 4 illustrates two examples, with three separate uses of the file names Foxtrot.DAT and Golf.DAT, 330, 344, 330'. In two instances 330, 330', the files Foxtrot.DAT and Golf.DAT retain the same respective file sizes (1259 and 3511). In a third instance 344, only the file labeled Golf.DAT has a different file size (5167) suggesting that the set of files 344 are related to the other two instances 330, 330', although Golf.DAT has been modified. The relationships between these instances of repetition can be used to compact storage of the scan representing the file hierarchy.

Figure 5:
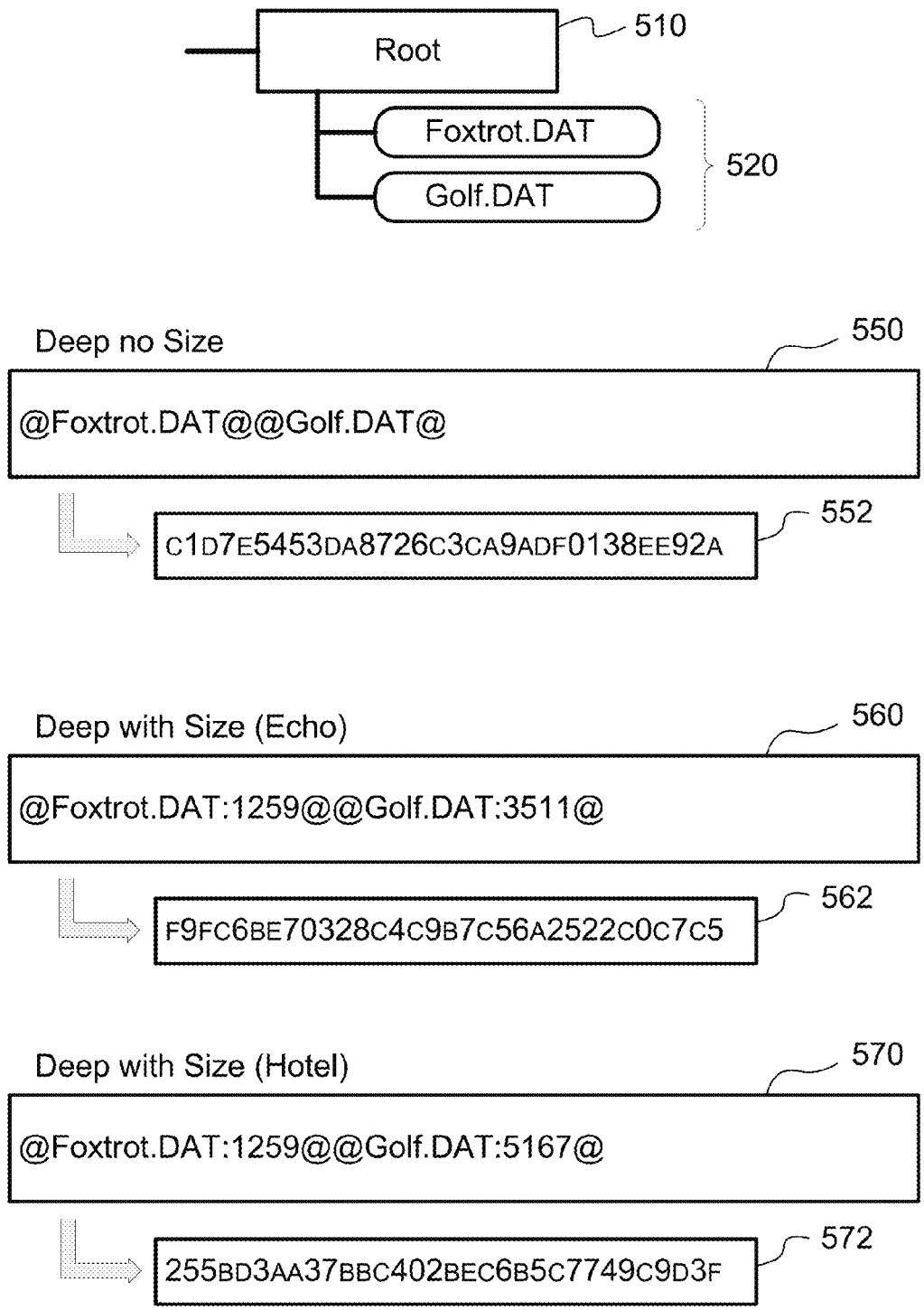
FIG. 5 is an illustration of string descriptors and signatures for specific sub-directories of the example file hierarchy of FIG. 3.

FIG. 5 illustrates string descriptors for some of the sub-directories illustrated in FIG. 3. A root directory 510 has two files 520, Foxtrot.DAT and Golf.DAT. This pattern of a root directory with two files with these file names appears in three places (330, 344, and 330') in the file hierarchy illustrated in FIG. 3. FIG. 5 illustrates a "Deep no Size" string descriptor 550 and MD5 digest 552 for the root directory 510. These signatures (in the clear 550 and in digest form 552) are the same for each of the three instances (330, 344, and 330') in FIG. 3. FIG. 5 illustrates a "Deep with Size" string descriptor 560 and MD5 digest 562 for the two instances (330 and 330') in FIG. 3 where the file sizes are the same and a "Deep with Size" string descriptor 570 and MD5 digest 572 for the one instance (344) in FIG. 3 where the file sizes are the different.

In two instances (330 and 330'), the Deep with Size signatures (in the clear 560 or as a digest 562) are the same. The second instance may be recorded by setting a second parent for the first instance. No new entries need to be created to represent deeper subdirectories or files, as they are present in the first instance. This allows for a compact representation in storage of the scan.

In all three instances (330, 344, and 330'), the Deep no Size signatures (in the clear 550 and in digest form 552) are the same. An auditor can detect that each of these instances has the same Deep no Size signature and determine that there is a relationship between them. For example, the auditor can identify the set of three instances with the same Deep no Size signature 552 and compare (for the instances in the set) the Deep with Size signatures 562 and 572—detecting that two instances (330 and 330') are equivalent and that a file size is different for the third instance 344.

Figure 6:
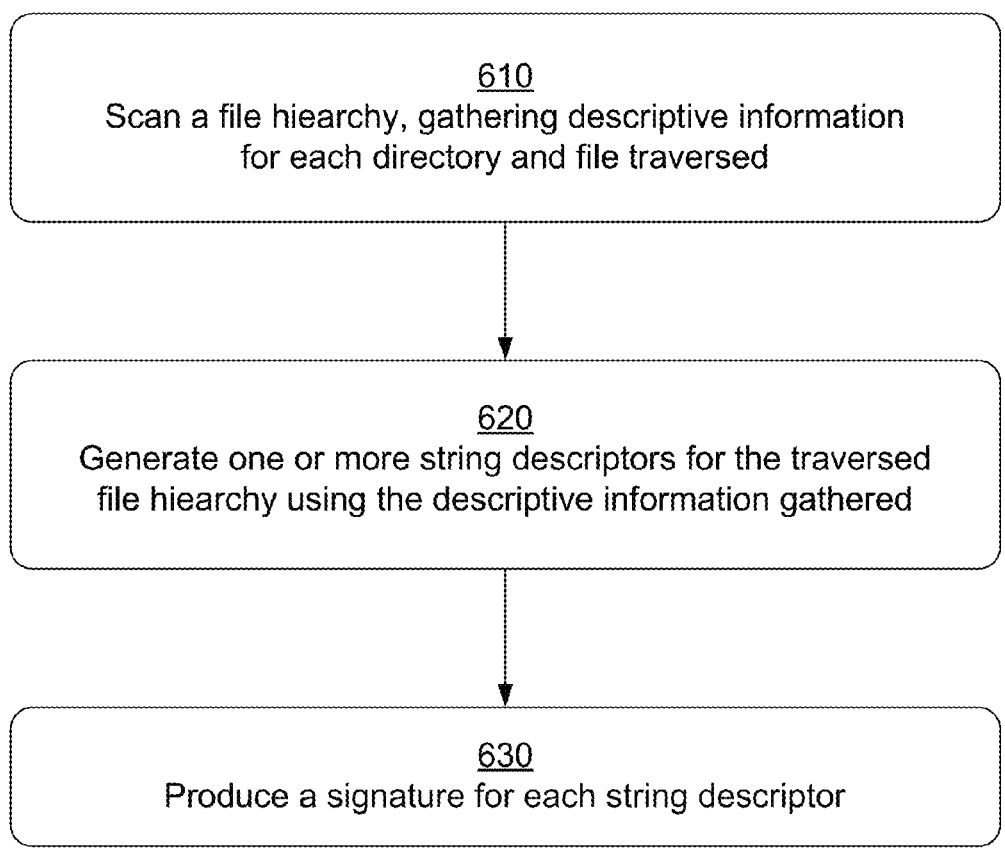
FIG. 6 is a flowchart illustrating a method of producing one or more signatures.

FIG. 6 is a flowchart illustrating a method of producing one or more signatures for a set of files. In brief overview, an auditor (e.g., an auditing system) scans a file hierarchy and gathers descriptive information for each directory and file in the hierarchy (step 610). The auditor generates one or more string descriptors for the traversed file hierarchy using the descriptive information gathered (step 620). The auditor produces a signature for each generated string descriptor (step 630). These signatures are representative of the file hierarchy traversed during the scan at step 610. In some implementations, the signatures are recorded in persistent storage.

In more detail, the method illustrated in FIG. 6 begins with an auditor, e.g., the auditor 140 illustrated in FIG. 1, scanning a file hierarchy and gathering descriptive information for each directory and file in the hierarchy (step 610). The auditor 140 may traverse the hierarchy in a depth first manner. The auditor 140 may traverse the hierarchy in a breadth first manner. Generally, each directory contains zero or more elements, e.g., data files, archive files, and sub-directories. For each directory traversed, the auditor 140 gathers descriptive information about any sub-directories and descriptive information about any files. For example, the auditor may gather information for elements satisfying the element selection criteria for the signature or signatures to be generated. In some implementations, the auditor gathers only the information indicated by one or more element descriptor component lists for the signatures to be generated. In some implementations, more information is gathered than is needed for the signatures (e.g., in anticipation of storing the information for future use). The gathered information may be persistently stored in a database, e.g., at an audit data storage system 148. The gathered information may be used to form signatures and then discarded. In some implementations, some of the information gathered is retained while other information is discarded.

The auditor generates one or more string descriptors for the traversed file hierarchy using the descriptive information gathered (step 620). The string descriptors are representations of the descriptive information, as described above in reference to the examples illustrated in FIGS. 4A-4D. A string descriptor represents a file hierarchy from the perspective of a root node. A second string descriptor can be created to represent a sub-directory of a file hierarchy, treating that sub-directory as a root node for that second string descriptor. Multiple string descriptors are created for the same file hierarchy, each string descriptor representing a different quantity of the gathered descriptive information. Table 1, above, provides illustrative string descriptor combinations as examples. In some implementations, if a file is identified as an archive of a file hierarchy, a separate scan may be conducted of the archived file hierarchy. The archive itself is a file (e.g., a ZIP file or a TAR file) and is treated as an archive file as described above. That is, it may be recorded in a data store as an archive file and included in string descriptors according to the creation rules (e.g., as shown in Table 1) for elements of type archive file.

The auditor produces a signature for each generated string descriptor (step 630). The signature may be produced by generating a hash or digest value for the string descriptor generated at step 620. The hash or digest value may be generated may be calculating a cyclic redundancy check, a message digest, an MD5 hash function, a cryptographic hash, or a non-cryptographic hash function, as described above. A file hierarchy represented by multiple string descriptors is associated with the signatures produced for each of the string descriptors. Thus a single file hierarchy may have multiple signatures. A string descriptor itself is a signature "in the clear." In some implementations, a signature is produced by calculating a digest or hash value for a string descriptor, as described above.

Generally, each of the signatures produced using the flowchart of FIG. 6 is associated with, and representative of, the file hierarchy traversed in the scan at step 610. In some implementations, signatures are produced for multiple sub-directories in a file hierarchy, each sub-directory treated as a root node for the respective signatures. For example, referring to FIGS. 3 and 5, the "Deep with Size" string descriptor 560 for the "Echo" sub-directory 320 treats that sub-directory 320 as a root 510. The signatures are generally stored in association with additional information about the file hierarchy traversed, as described above in reference to Tables 4 and 5. For example, the signatures may be stored by an audit data storage system 148, as illustrated in FIG. 1. In some implementations, the storage of information representing one or more file hierarchies uses the signature data to store the information compactly.

Figure 7:
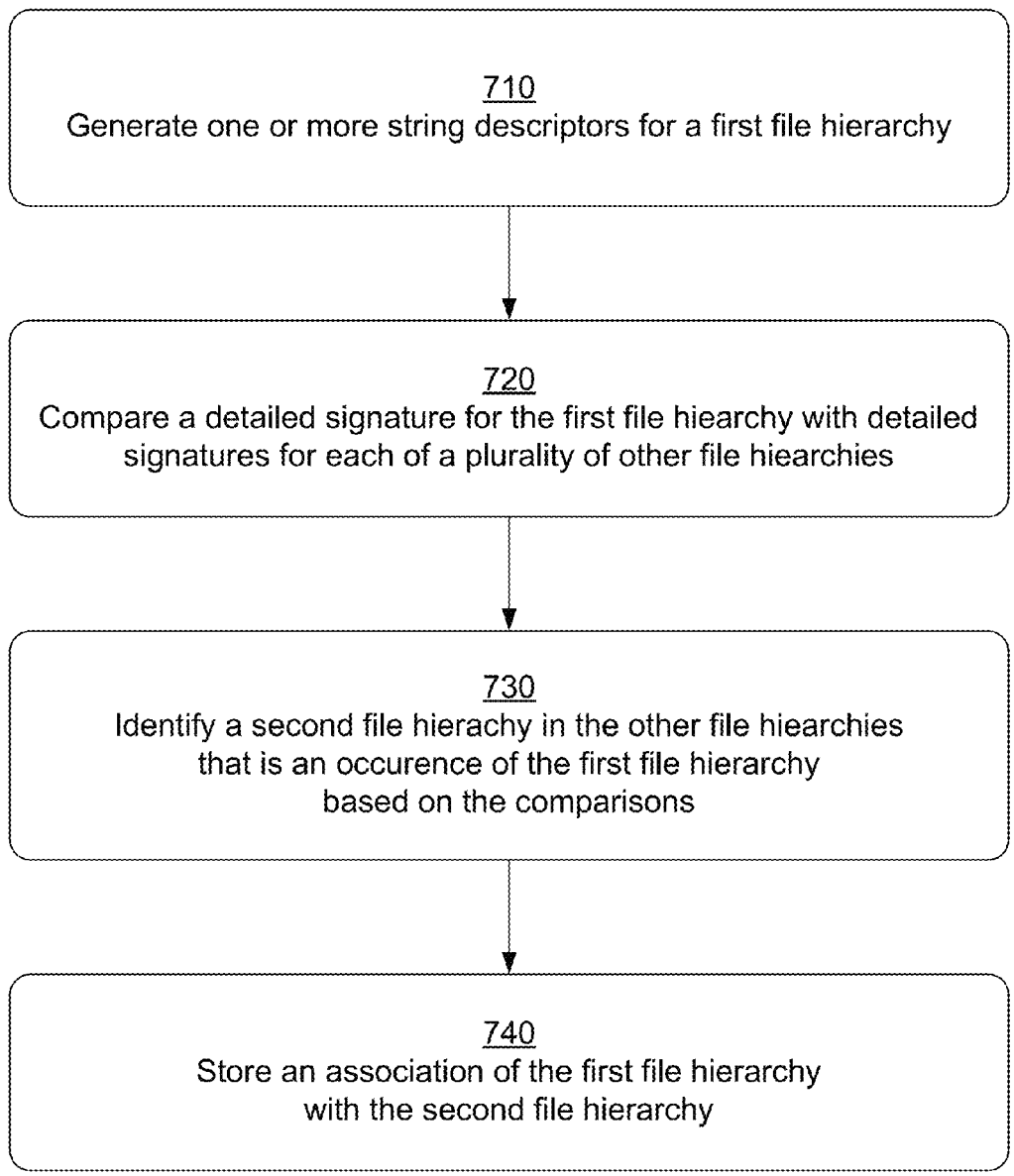
FIG. 7 is a flowchart illustrating a method for compact representation of a file hierarchy.

FIG. 7 is a flowchart illustrating a method for compact representation of a file hierarchy. In brief overview, an auditor, e.g., the auditor 140 illustrated in FIG. 1, generates one or more string descriptors for a first file hierarchy, e.g., using the method illustrated in FIG. 6 (step 710). The auditor compares a signature for the first file hierarchy with a signature of the same type (e.g., "Deep with Size") for each of a plurality of other file hierarchies in a data store (step 720). The auditor identifies a second file hierarchy in the other file hierarchies that is sufficiently similar to the first file hierarchy to be treated as an occurrence thereof, based on the step 720 comparisons (step 730). The auditor stores an association of the first file hierarchy with the second file hierarchy in the data store (step 740).

In more detail, the method illustrated in FIG. 7 begins with an auditor, e.g., auditor 140, generating one or more string descriptors for a first file hierarchy (step 710). For example, the auditor 140 may scan or traverse a file hierarchy as described in reference to FIG. 6. The auditor identifies the descriptive information needed to generate the one or more string descriptors. The string descriptors may be of the forms described above in reference to Tables 1-3 and illustrated in FIGS. 4A-4D. In some instances, the string descriptors are an index of the first file hierarchy. The first file hierarchy may be a set of files at a host computing device 120. The first file hierarchy may be components of a software project, e.g., source code, compiled libraries, and related data files. The first file hierarchy may be materials subject to limitations on replication. The auditor may generate string descriptors of different descriptive information for the file hierarchy such that the string descriptors are of different granularities.

The auditor compares a signature for the first file hierarchy with a signature (of the same type) for each of a plurality of other file hierarchies in a data store, i.e., the data store for hosting file hierarchy information (step 720). For example, in some implementations, the detailed signature type is the "Deep with Size" signature type described above in reference to Table 1.

The auditor identifies a second file hierarchy in the other file hierarchies that is sufficiently similar to the first file hierarchy to be treated as an occurrence thereof, based on the step 720 comparisons (step 730). If the auditor locates previous scan of a file hierarchy that resulted in the same signature value (for the specific type of signature compared), then the two instances are likely related. In some implementations, having the same "Deep with Size" signature is sufficient to conclude that the two instances are equivalent. As described above, the degree of similarity implied by the selected signature type defines a degree of lossiness for compression of the storage. In some implementations, additional comparisons are used to validate the equivalence.

The auditor stores an association of the first file hierarchy with the second file hierarchy in the data store (step 740). That is, instead of creating an entire new entry, the information that is the same is associated with both file hierarchies. This results in a more compact representation in the data store. In some implementations, a representation is stored for a directory with multiple parent directories—one for each instance where the file hierarchy represented was identified.

The compact representation of file hierarchies using signatures, as illustrated in FIG. 7, may be used to create a compact index. In some implementations, a file aggregator or archive system uses the compact representation of a file hierarchy in building an index for aggregated or archived files. The file aggregator or archive system identifies redundancies within a file hierarchy, e.g., using comparisons as described herein, and achieves improved compression by including only a first instance of each redundant file in an aggregation package or archive file.

The compact representation of file hierarchies using signatures, as illustrated in FIG. 7, may be used to create a catalog of file sets. In some implementations, an audit system accesses a data store hosting a catalog of signatures associated with various file sets. The audit system can compare signatures for a subject file hierarchy to signatures in the catalog and determine if the subject file hierarchy is equivalent to, or related to, any of the file sets represented in the catalog. Each signature comparison is between two signatures of the same type, e.g., the types illustrated in Table 1.

Figure 8:
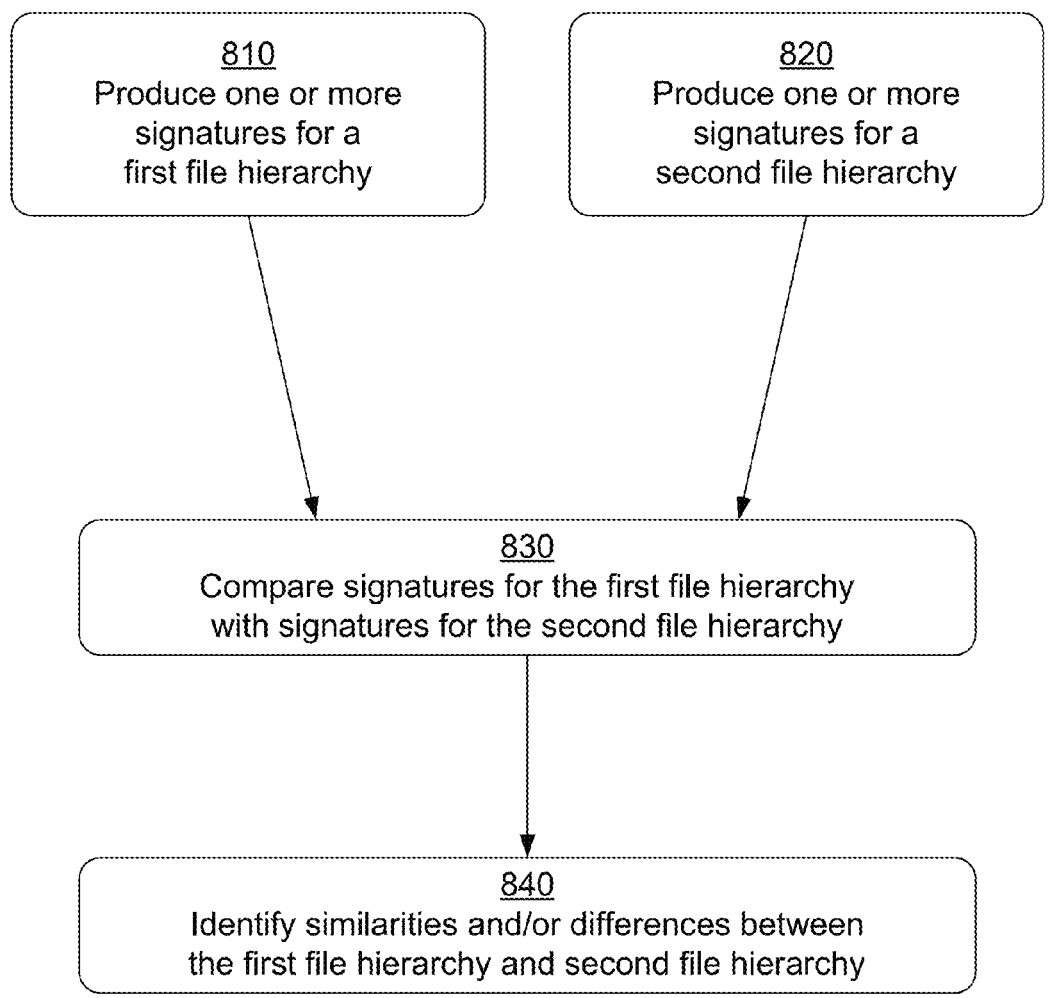
FIGS. 8-11 are flowcharts illustrating methods for comparing file hierarchies.

FIG. 8 is a flowchart illustrating a method for comparing file hierarchies. In brief overview, an auditor produces one or more signatures for a first file hierarchy at step 810 and for a second file hierarchy at step 820. An auditor compares these signatures for the first file hierarchy with signatures for the second file hierarchy (step 830) and identifies similarities and/or differences between the first file hierarchy and the second file hierarchy (step 840).

In more detail, the method illustrated in FIG. 8 begins with an audit system, e.g., an auditor 140 as shown in FIG. 1, producing one or more signatures for a first file hierarchy (step 810). Generally, the signatures produced represent information about the first file hierarchy at various levels of granularity. Any of the signatures described herein may be produced at step 810. In some implementations, the signatures are produced locally at a host computing system 120. In some implementations, an auditor 140 connects to a host computing system 120, e.g., via a network 110, and analyzes data stored by the host computing system 120, e.g., at a host data storage system 128. The signatures produced at step 810 are representative of the data analyzed. The signatures may be stored by the auditor, e.g., at an audit data storage system 148.

An auditor, e.g., an auditor 140, produces one or more signatures for a second file hierarchy (step 820). Generally, the production of signatures at 820 is the same as the production in step 810, only applied to either a different file system (or portion of the file system) than in step 810 or applied to the same file system but at a different time than in step 810. Steps 810 and 820 may occur at different times and may be performed by different auditors.

An auditor, e.g., an auditor 140, compares signatures for the first file hierarchy with signatures for the second file hierarchy (step 830). The signatures compared are those produced in steps 810 and 820. The auditor performing step 830 may be the same auditor as in step 810 and/or step 820, or may be a different auditor. In some implementations, an auditor performs step 810 in an ongoing manner across many file hierarchies and builds a database or collection of string descriptors and signatures. When the auditor performs step 830, the file hierarchy traversed at step 820 is compared to the database or collection built in step 810. Generally, as described herein, the auditor compares signatures of the same type, such that they have equivalent levels of granularity, and detects where the signatures match or do not match.

The auditor identifies similarities and/or differences between the first file hierarchy and the second file hierarchy based on the step 830 comparison of signatures (step 840). Generally, differences between two sets of files may be identified when some signatures match and other signatures do not match. The different matches direct efficient identification of the distinctions between the two sets of files and allow for rapid identification of relationships and isolation of differences. The auditor uses the comparisons of step 830 to efficiently identify sub-sets of files that match and sub-sets of files that do not match. This analysis uses various properties of the signatures as described herein.

Figure 9:
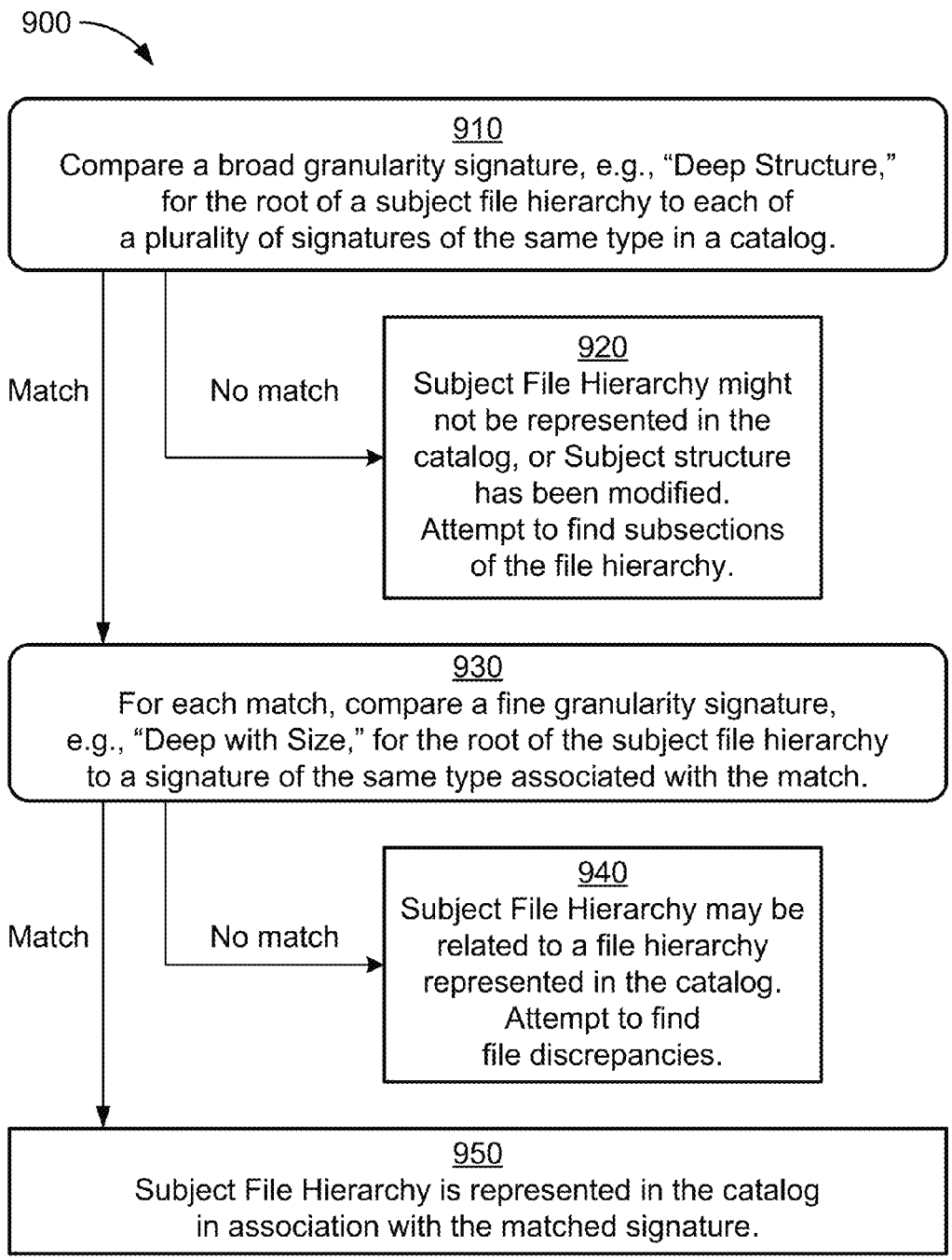
Figure 10:
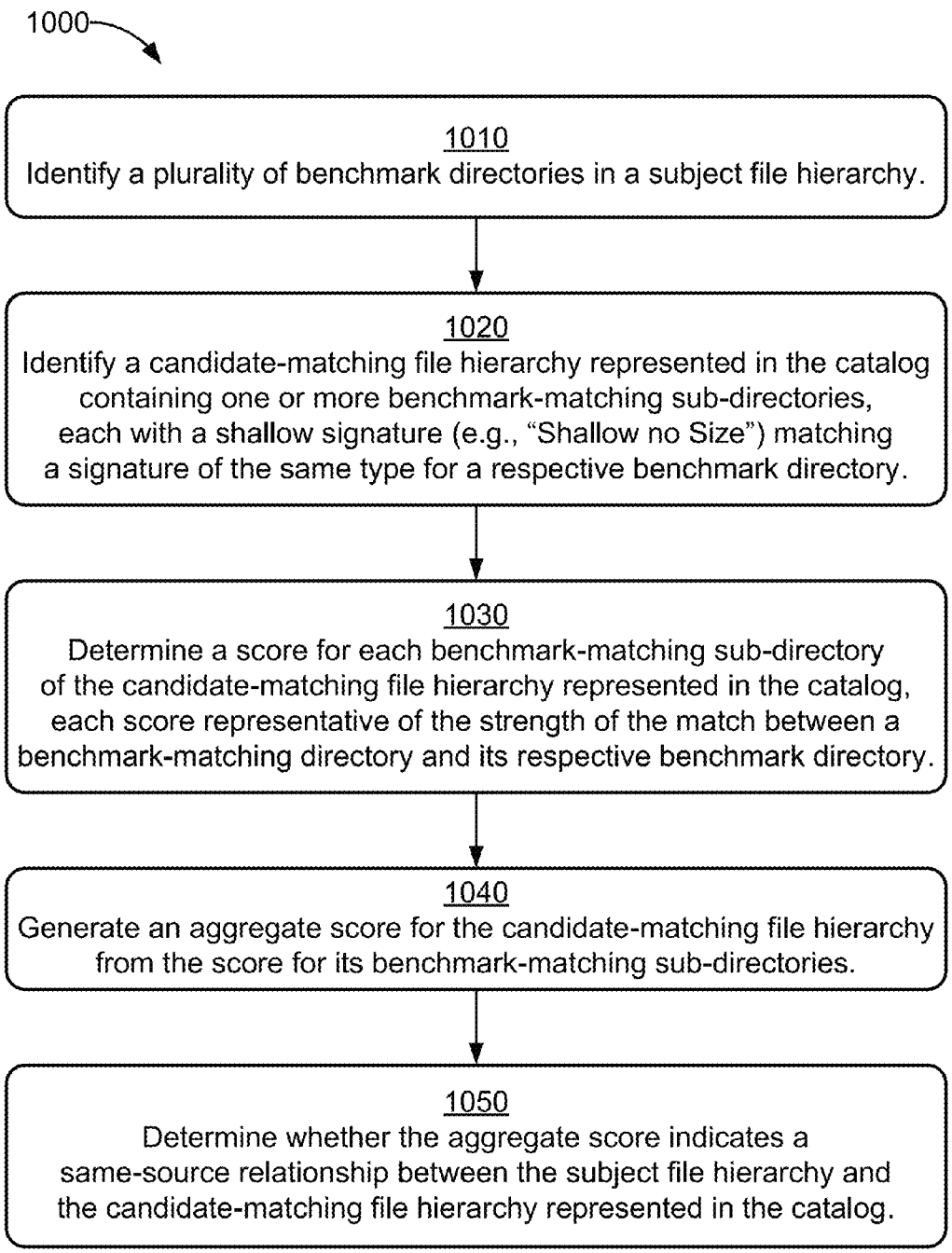
Figure 11:
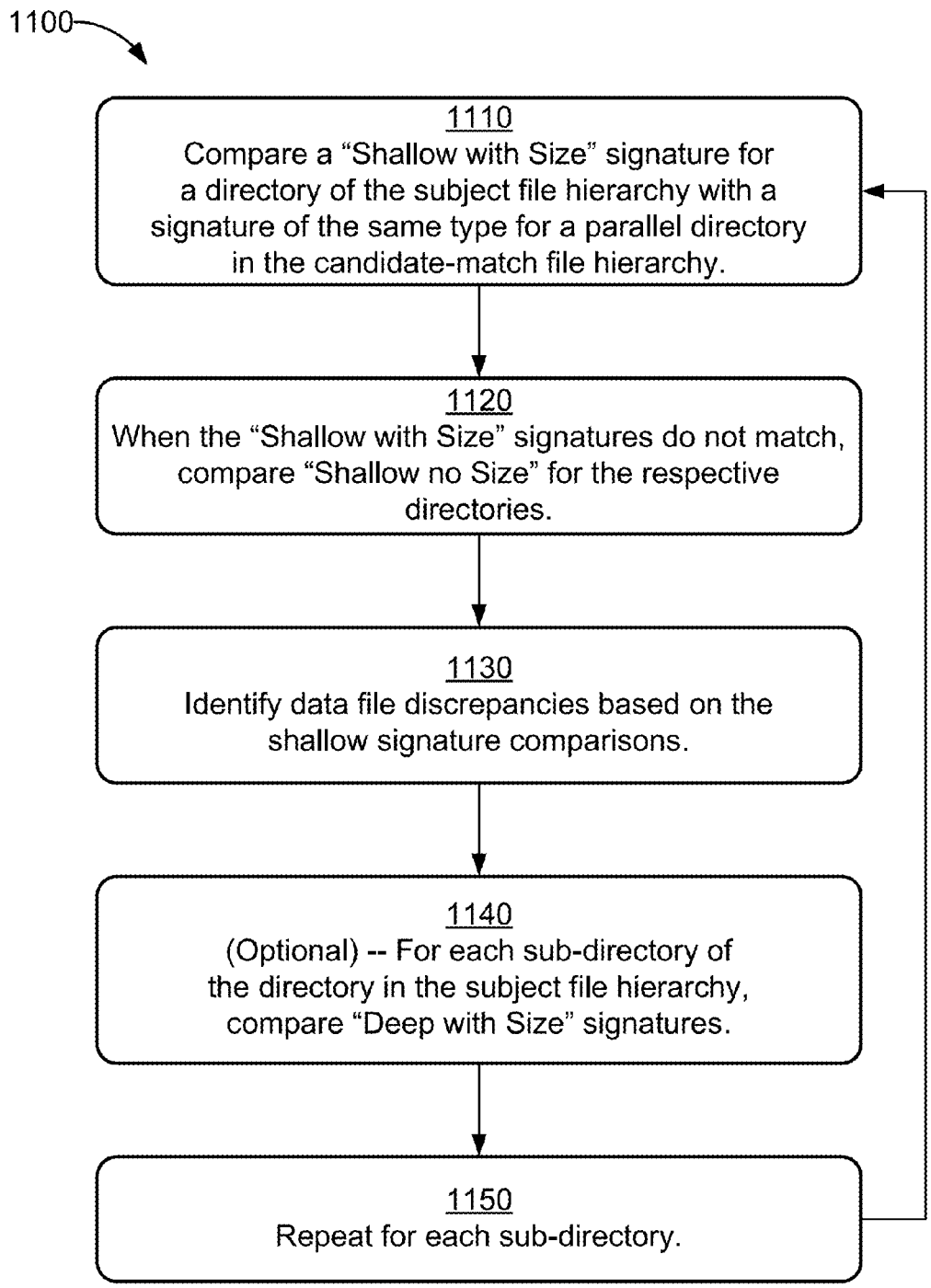

FIGS. 9-11 are flowcharts illustrating aspects of methods for identifying, for a particular "subject" file hierarchy, related file hierarchies represented in a catalog of file hierarchies. Generally, two file hierarchies may be equivalent, may be related as different branch copies of the same file hierarchy, or may be unrelated. Thus the subject file hierarchy may match a file hierarchy represented in the catalog, the subject file hierarchy may have sufficient similarity to a file hierarchy represented in the catalog to be considered related by a same-source relationship, or the subject file hierarchy might not be related to any file hierarchy represented in the catalog. Generally, two file hierarchies are related when there is sufficient evidence that one is a modification of the other or that they are both modifications of a shared ancestor, i.e., that they are both branch copies of the same file hierarchy (these are really the same, where one of the file hierarchies in the first case is an unmodified branch copy of the ancestor file hierarchy). A file hierarchy may be modified by altering a file (a data file or an archive file), adding or removing a file (a data file or an archive file), or adding or removing a sub-directory. Adding or removing a file or sub-directory is equivalent to altering a directory.

The difference between two file hierarchies can be formalized as a Tree Edit Distance ("TED"), which is the number of changes to one tree needed to make two trees identical. In some implementations, an audit system calculates a TED between a subject file hierarchy and various candidate-matching file hierarchies represented in a catalog. For example, the audit system may return the candidate-matching file hierarchy with the smallest TED from the subject file hierarchy. In some implementations, an audit system generates a score approximating the likelihood of a same-source relationship without calculating a precise Tree Edit Distance.

In some implementations, an audit system is used to identify a subject file hierarchy by comparing signatures representative of the subject file hierarchy to signatures (of the same type) representative of other file hierarchies. Signature matches indicate that the two file hierarchies represented by the matching signatures have some form of relationship, dependent on the type of signature used. For example, as described below, in some implementations, two comparisons are sufficient to determine the nature of at least one difference between a first file hierarchy and a second file hierarchy. In some implementations, the comparisons can indicate that there is a file present in one file hierarchy that is not present in the other file hierarchy. In some implementations, the comparisons can indicate that a file is present in the first file hierarchy with a first file size and present in the second file hierarchy with a second file size different from the first file size.

In some implementations, the audit system maintains a catalog of signatures representative of the other file hierarchies, for use in such comparisons. Tables 4 and 5, described above, provide examples of data that may be stored in such a catalog. FIG. 9 is a flowchart for determining if a subject file hierarchy is represented in a catalog of signatures representing file hierarchies. FIG. 10 is a flowchart for determining if portions of a subject file hierarchy are represented in a catalog of signatures representing file hierarchies. FIG. 11 is a flowchart for quantifying a relationship between two structurally similar file hierarchies.

FIG. 9 is a flowchart for determining if a subject file hierarchy is represented in a catalog of signatures representing file hierarchies. In brief overview, a method 900 compares signatures (e.g., of the types described above in reference to Table 1) for a directory in a subject file hierarchy to signatures in a catalog of signatures representing file hierarchies. The subject directory is treated as a root directory in that the comparisons ignore any parent directories to the subject directory; however, the subject directory may reside in a file system or archive and may have a parent directory therein. The method 900 begins with comparisons of a broad signature, e.g., "Deep Structure," for the root directory of the subject file hierarchy to each of a plurality of signatures of the same type in the catalog (step 910). When there are no matches in step 910, the subject file hierarchy is not precisely represented in the catalog (i.e., there is no representation with a Tree Edit Distance, "TED," of zero). The analysis may continue to determine if the subject file hierarchy is related to a file hierarchy represented in the catalog (step 920). When there are matches in step 910, the subject file hierarchy may be represented in the catalog—the method 900 continues by comparing a fine granularity signature, e.g., "Deep with Size," for the root directory of the subject file hierarchy to signatures of the same type associated with the matches found (step 930). When there are no matches in step 930, the subject file hierarchy is not precisely represented in the catalog. The analysis may continue to determine if the subject file hierarchy is related to a file hierarchy represented in the catalog (step 940). When there is a match in step 930, the subject file hierarchy is likely to be represented in the catalog (step 950).

In more detail, the method 900 begins with comparisons of a broad granularity signature, e.g., "Deep Structure," for the root directory of the subject file hierarchy to each of a plurality of signatures of the same type in the catalog. At step 910, an audit system, e.g., an auditor 140 as shown in FIG. 1, compares the broad signature representative of the subject file hierarchy to broad signatures of the same type present in the catalog. In some implementations, a "Deep Structure" signature is used. The "Deep Structure" signature only represents the sub-directory structure and not the data files present. Thus if a file hierarchy were copied and the data files altered, the copy would still yield the same "Deep Structure" as the originally copied file hierarchy. Aside from trivial directory structures such as empty directory hierarchies or common directory hierarchies (e.g., "bin" and "lib" directory structures seen in many Unix-type installations or "My Documents" directory structures seen in many Microsoft Windows® type installations), a matching structural signature is a good indication of some relationship between two file hierarchies.

When there are no matches in step 910, the subject file hierarchy is not precisely represented in the catalog (i.e., there is no representation with a TED of zero). However, although there is no exact match, the subject file hierarchy may be closely related to a file hierarchy represented in the catalog. The analysis may continue at step 920 to determine the extent of any such relationship. Where broad signature comparisons of step 910 do not yield a match, either the subject file hierarchy is not represented in the catalog or there has been a structural modification. For example, adding a new sub-directory to a copied file hierarchy will cause the copy to yield a different structural signature than the originally copied file hierarchy. However, portions of the file hierarchy may be represented in the catalog. In some implementations, the audit system repeats the method 900 for each sub-directory of the subject root directory. That is, each sub-directory of the current subject directory becomes the root for a recursive iteration of the method 900. In some implementations, the audit system explores the subject file hierarchy using shallow signatures, as illustrated in FIG. 10. Shallow signatures (or controlled depth signatures) are used because the "Deep Structure" signature has already indicated that no deep signature will match from the root directory.

When there are matches in step 910, the subject file hierarchy may be represented in the catalog. The method 900 continues at step 930 with the audit system comparing a fine granularity signature, e.g., "Deep with Size," for the root directory of the subject file hierarchy to signatures of the same type associated with the matches found in step 910. Each match found in step 910 identifies a potentially related file hierarchy associated with the broad granularity signature matched. At step 930, the audit system compares, for each file hierarchy identified in step 910, a fine granularity signature for the file hierarchy in the catalog with a fine granularity signature for the subject file hierarchy. In some implementations, a "Deep with Size" signature is used. The "Deep with Size" signature represents the sub-directory structure and metadata for the files present. A match between "Deep with Size" signatures for two file hierarchies indicates a high likelihood that they are the same. Thus the broad granularity signature comparison in step 910 identifies potentially related file hierarchies and the fine granularity signature comparison in step 930 determines if any of the identified potentially related file hierarchies are equivalent to the subject file hierarchy.

When there are no matches in step 930, the subject file hierarchy is not precisely represented in the catalog (i.e., there is no representation with a TED of zero). The analysis may continue at step 940 to determine if the subject file hierarchy is related to a file hierarchy represented in the catalog (with a non-zero TED). Where the fine signature comparisons of step 930 do not yield a match, either the subject file hierarchy is not represented in the catalog at all or there has been a modification to the contents of one or more subdirectories through addition or removal of files or edits to files. Because the broader signature matched in step 910, it is likely that the subject file hierarchy has some relation to one or more file hierarchies represented in the catalog. The extent of any such relationships may be determined. In some implementations, the audit system computes a TED between the subject file hierarchy and each candidate-matching file hierarchy. In some implementations, when the respective deep detail signatures ("Deep with Size") do not match, the audit system compares a deep broad signature (e.g., "Deep no Size") for the subject file hierarchy with a signature of the same type for the candidate-match file hierarchy represented in the catalog. If the signatures match, this indicates that the file names are the same but at least one file has been modified in one of the two file hierarchies. In some implementations, the audit system generates a more precise score through the method illustrated by the flowchart of FIG. 11.

When there is a match in step 930, the subject file hierarchy is likely to be represented in the catalog (step 950). A match between "Deep with Size" signatures for two file hierarchies indicates a high likelihood that they have a TED of zero and are thus the same. In some implementations, the audit system outputs an indication of the match. In some implementations, the audit system outputs an identifier for the file hierarchy in the catalog associated with the matched signature.

In some implementations, the method 900 is used as part of a broader comparison. That is, the subject root directory analyzed in steps 910 and 930 may be a sub-directory in a larger file hierarchy. An identification of an equivalent file hierarchy in the catalog (at step 950) or of a related file hierarchy in the catalog (as steps 920 or 940) may contribute to identifying a relationship between larger file hierarchies. For example, if a subject file hierarchy has several branches of sub-directories each equivalent to directories represented in the catalog, then the subject file hierarchy may be closely related to those directories. The directories represented in the catalog may have a shared parent or ancestor directory (as indicated, e.g., by the "Distance From Root" attribute discussed above in reference to Tables 4 and 5). In some implementations, the number of sub-directories in a subject file hierarchy that match to representations in the catalog is an indication of the extent to which two file hierarchies are related. A higher percentage of fine granularity signature matches indicates a close relationship while a low percentage of less specific signature matches indicates a less close relationship, if any. Thus an audit system may tally matches by signature type to build a profile of the subject file hierarchy and determine an extent to which it is related to a particular file hierarchy previously scanned.

FIG. 10 is a flowchart for determining if portions of a subject file hierarchy are represented in a catalog of signatures representing file hierarchies. Generally, the method 1000 illustrated in FIG. 10 is used when a root directory for a subject file hierarchy does not have a structural match (e.g., a matching "Deep Structure" signature) to any of the file hierarchies represented in the catalog. The lack of a structural match indicates that no file hierarchy represented in the catalog is exactly equivalent to the subject file hierarchy. The method 1000 looks in the catalog for a represented file hierarchy that is not exactly equivalent to the subject file hierarchy and is, instead, likely to have a shared source file hierarchy (which may be the represented file hierarchy itself). The method 1000 identifies sub-directories of the subject file hierarchy with shallow signatures (e.g., a "Shallow no Size" signature) that each match to signatures of the same type for sub-directories of a file hierarchy represented in the catalog. The sub-directories of the subject file hierarchy serve as benchmarks for the broader file hierarchy match. A score is generated for each comparison between a benchmark directory of the subject file hierarchy and a benchmark-matching directory of the candidate-matching file hierarchy represented in the catalog. These scores are aggregated to generate a score quantifying the relationship between the subject file hierarchy and the candidate-matching file hierarchy; this score can be used in determining whether there is a same-source relationship between the subject file hierarchy and the candidate-matching file hierarchy represented in the catalog.

In brief overview, the method 1000 begins with an audit system identifying a plurality of benchmark directories in the subject file hierarchy (step 1010). The audit system identifies a candidate-matching file hierarchy represented in the catalog containing one or more benchmark-matching sub-directories (step 1020). The audit system determines a comparison score for each benchmark-matching sub-directory of the candidate-matching file hierarchy represented in the catalog, each comparison score representative of the comparison (e.g., the strength of a signature match) between a benchmark directory and its respective benchmark-matching directory (step 1030). The audit system generates an aggregate score for the candidate-matching file hierarchy from the comparison scores for the benchmark-matching sub-directories of the candidate-matching file hierarchy (step 1040). The aggregate score indicates a likelihood of a same-source relationship between the subject file hierarchy and the candidate-matching file hierarchy represented in the catalog (step 1050).

In more detail, the method 1000 begins with an audit system identifying a plurality of benchmark directories in the subject file hierarchy (step 1010). The audit system traverses the subject file hierarchy. A benchmark directory can be any non-trivial directory. In some implementations, a benchmark directory is a directory with at least a predetermined number of data files (e.g., five) and/or at least a predetermined number of sub-directories (e.g., two). In some implementations, these threshold values are set in a configuration, which may be stored by the audit system. In some implementations, the threshold values are dynamically set in relation to directories within the subject file hierarchy. In some implementations, the benchmarks are prioritized. For example, in some implementations, the audit system prioritizes the benchmark directories with the most files, the most sub-directories, or the closest to (or furthest from) the root directory (i.e., "Distance From Root").

The audit system identifies a candidate-matching file hierarchy represented in the catalog containing one or more benchmark-matching sub-directories (step 1020). For each benchmark directory identified at step 1010, the audit system compares a shallow directory-only signature (e.g., a "Shallow no Size" signature) for the benchmark directory to signatures of the same type in the catalog. Shallow signature comparisons are repeated until a benchmark-matching directory is found in the catalog where the shallow signature of the benchmark directory matches a signature of the same type for the benchmark-matching directory. The benchmark-matching directory is a sub-directory of a file hierarchy represented in the catalog; the represented file hierarchy is a candidate-matching file hierarchy and has some potential for a same-source relationship with the subject file hierarchy. In some implementations, the benchmark comparison is expanded to include comparisons between parent directories, ancestor directories, and/or children sub-directories of both the benchmark directory and the benchmark-matching directory. In some implementations, multiple benchmark-matching directories must be found in the candidate-matching file hierarchy, each for a respective one of a plurality of benchmark directories in the subject file hierarchy. The multiple benchmark-matching directories anchor the file hierarchy comparison and comparison scores for each are aggregated into a score for the relationship between the two file hierarchies (the subject and the candidate-match).

The audit system determines a comparison score for each benchmark-matching sub-directory of the candidate-matching file hierarchy represented in the catalog, each comparison score representative of the comparison (e.g., the strength of a signature match) between a benchmark-matching directory and its respective benchmark directory (step 1030). In some implementations, the comparison score is a one (or any other non-zero constant) when the "Shallow no Size" signature for the benchmark directory is equal to the "Shallow no Size" signature for the benchmark-matching directory, and otherwise the comparison score is a zero (no match). In some implementations, the audit system performs additional comparisons when the "Shallow no Size" signature for the benchmark directory is equal to the "Shallow no Size" signature for the benchmark-matching directory. The additional comparisons contribute to the score, giving more weight for a closer relationship. For example, in some implementations, when the "Shallow no Size" signature for the benchmark directory is equal to the "Shallow no Size" signature for the benchmark-matching directory, the audit system compares "Shallow with Size" signatures for the benchmark directory and the benchmark-matching directory; if the "Shallow with Size" signatures also match, the comparison score is higher.

In some implementations, the audit system expands the comparison to include comparisons of shallow signatures for the respective parent directories for the benchmark directory and the benchmark-matching directory. In some implementations, the audit system expands the comparison to include comparisons of shallow signatures for the respective ancestor directories (parent, grandparent, etc.) for the benchmark directory and the benchmark-matching directory. In some implementations, the audit system expands the comparison to include comparisons of the respective sub-directories for the benchmark directory and the benchmark-matching directory, e.g., by comparing deep signatures for the benchmark directory and the benchmark-matching directory. In some implementations, the audit system expands the comparison to include comparisons of deep signatures for the respective ancestor directories of the benchmark directory and the benchmark-matching directory. Each of these comparisons is reflected in the comparison score, with more weight given to comparisons that include multiple directories.

For example, in some implementations, the audit system iteratively compares Shallow no Size signatures for the respective ancestor directories (starting at parent, then grandparent, and so forth) for the benchmark directory and the benchmark-matching directory until an ancestor directory fails to match. The audit system then compares "Deep with Size" signatures for the last matching ancestor to the benchmark directory and the last matching ancestor to the benchmark-matching directory. If the "Deep with Size" signatures don't match, the audit system compares Deep no Size signatures. The benchmark comparison is then scored, for example, by totaling the number of matched ancestor directories plus a depth score for the deep comparison (e.g., a higher value if the Deep with Size signatures matched and a lower value if the Deep no Size signature matched, and no depth score when neither matched).

The audit system generates an aggregate score for the candidate-matching file hierarchy from the comparison scores for the benchmark-matching sub-directories of the candidate-matching file hierarchy (step 1040). That is, when a candidate-matching file hierarchy represented in the catalog contains multiple benchmark-matching sub-directories, the scores determined in step 1030 are aggregated into a composite aggregate score for the candidate-matching file hierarchy. In some implementations, the individual scores are added. In some implementations, additional weights are given to each score prior to aggregation.

The aggregate score indicates a likelihood of a same-source relationship between the subject file hierarchy and the candidate-matching file hierarchy represented in the catalog (step 1050). In some implementations, the audit system determines whether the aggregate score indicates a same-source relationship between the subject file hierarchy and the candidate-matching file hierarchy represented in the catalog. In some implementations, the audit system identifies the candidate-matching file hierarchy with the highest score. In some implementations, the audit system determines that a candidate-matching file hierarchy is not a match unless the aggregate score exceeds a threshold value. The audit system may return a plurality of candidate-matching file hierarchies with scores above a threshold value. The audit system uses the aggregate score to determine a likelihood that the candidate-matching file hierarchy represented in the catalog is the source of, or has the same source as, the subject file hierarchy.

FIG. 11 is a flowchart for approximating a degree of similarity between a subject file hierarchy and a candidate-matching file hierarchy represented in a catalog of signatures representing file hierarchies. Generally, the method 1100 illustrated in FIG. 11 is used when a root directory for a subject file hierarchy has a structural match (e.g., a matching "Deep Structure" signature) to a candidate-matching file hierarchy represented in the catalog, but a more detailed signature comparison has failed (see FIG. 9). The structural match generally indicates that the candidate-matching file hierarchy represented in the catalog is probably related to the subject file hierarchy. The method 1100 traverses the subject file hierarchy and the candidate-matching file hierarchy represented in the catalog to identify differences between the two file hierarchies. In some implementations, the method 1100 is restricted to a predetermined depth of sub-directories. In some implementations, an audit system uses a permutation of signature comparisons other than the comparisons illustrated in FIG. 11.

The method 1100 begins after an audit system has compared a deep structural signature, e.g., "Deep Structure," and a deep detail signature, e.g., "Deep with Size," for a root directory of the subject file hierarchy with signatures of the same type for a top directory of a candidate-match file hierarchy represented in the catalog. As context, the "Deep Structure" signatures matched and the "Deep with Size" signatures did not. The root directory of the subject file hierarchy is parallel to the top directory of the candidate-match file hierarchy. Two structurally equivalent file hierarchies do not have matching "Deep with Size" signatures when a file name has been added or removed (or modified, which is both) and/or when a file size has been modified. Therefore, when the respective deep detail signatures ("Deep with Size") do not match, there is a discrepancy causing the mismatch. The method 1100 traverses the file hierarchies in parallel to count or identify locations of these discrepancies.

In brief overview of the method 1100, the audit system determines if the instant directory (initially the root directory) is the source of the discrepancy by comparing a shallow signature (e.g., "Shallow with Size") for the directory in the subject file hierarchy with a signature of the same type for the parallel directory of a candidate-match file hierarchy represented in the catalog (step 1110). If the shallow signatures match, the discrepancy is in a lower sub-directory. When the "Shallow with Size" signatures do not match, the audit system compares a broader signature (e.g., "Shallow no Size") for the respective directories (step 1120). The audit system identifies any file discrepancies based on the signature comparisons of steps 1110 and 1120 and generates audit data for reporting the analysis (step 1130). The audit system then continues to traverse any sub-directories. For each sub-directory, the audit system may compare a deep detail signature (e.g., "Deep with Size") for the sub-directory in the subject file hierarchy with a signature of the same type for the parallel sub-directory of the candidate-match file hierarchy represented in the catalog (step 1140). The audit system repeats the method 1100, starting at step 1110, for any sub-directory that may contain data file discrepancies (step 1150).

In more detail, the audit system compares a shallow signature (e.g., "Shallow with Size") for a directory in the subject file hierarchy with a signature of the same type for a parallel directory of a candidate-match file hierarchy represented in the catalog (step 1110). If the shallow signatures match, the file discrepancy is in a lower sub-directory. If the shallow signatures do not match, there is a file discrepancy in the instant directory.

When the "Shallow with Size" signatures do not match, and the audit system distinguishes between file discrepancy types, the audit system compares a broader signature (e.g., "Shallow no Size") for the respective directories (step 1120). If the shallow signatures without file sizes match, then only the file sizes are different between the two directories. If the shallow signatures without file sizes do not match, then the file names are also different. In some implementations, the audit system compares additional signatures for the respective directories, e.g., constellation signatures.

The audit system identifies any file discrepancies based on the signature comparisons of steps 1110 and 1120 and generates audit data for reporting the analysis (step 1130). In some implementations, the audit system counts each location of a file discrepancy regardless of discrepancy type (file name change or file size change) (step 1120 is omitted in these implementations). In some implementations, the audit system builds a list or index of directories with discrepancies. In some implementations, the audit system counts a number of discrepancies and determines that a candidate-match file hierarchy represented in the catalog is not related to the subject file hierarchy if the count exceeds a threshold. In some implementations, the count is incremented by an amount weighted by discrepancy type, e.g., the count may be incremented more when file names have changed than when file sizes have changed.

The audit system then continues to traverse any sub-directories. In some implementations, the audit system stops after identifying a predetermined number of file discrepancy locations (e.g., after the first, after ten, after ten percent of the directories, etc.).

For each sub-directory, the audit system may compare a deep detail signature (e.g., "Deep with Size") for the sub-directory in the subject file hierarchy with a signature of the same type for the parallel sub-directory of the candidate-match file hierarchy represented in the catalog (step 1140). If these deep signatures match, the audit system does not need to traverse the particular sub-directory further. If the deep signatures do not match, nothing new has been learned. Therefore, if the number of sub-directories is small or if generating a deep signature is undesirable, the audit system may omit the Deep with Size comparison and continue as though there was no match. However, where the benefit of finding Deep with Size matches outweighs the cost, the audit system may include step 1140.

The audit system repeats the method 1100, starting at step 1110, for any sub-directory that may contain data file discrepancies (step 1150). The audit system repeats the method 1100, starting at step 1110, for any sub-directory that fails to match in the comparison at step 1140, or for which step 1140 was omitted. In some implementations, step 1140 is omitted when there is only one sub-directory. In some implementations, step 1140 is omitted when the method 1110 is only performed to a predetermined depth and generating the deep signatures is not desirable. In some implementations, step 1140 is not omitted.

The discrepancies identified by the method 1100, at step 1130, are locations where the files have been modified. If a small number of data files, in relation to the total number of data files in the file hierarchy, have been modified, then the file hierarchies are likely to have a same-source relationship. Additionally, the method 1100 identifies where the modified files are located, enabling a quick comparison between specific files. Even where many of the files have been modified, the file hierarchies may be related—particularly if the modifications are only to file sizes. For example, a source code file may be modified by adding or removing comments. The functional portion of the file may be unchanged.

It should be understood that the systems and methods described above may be provided as instructions in one or more computer programs recorded on or in one or more articles of manufacture, e.g., computer-readable media. The article of manufacture may be a floppy disk, a hard disk, an optical disc such as CD-ROM, DVD-ROM, or Blu Ray, a flash memory card, a portable memory chip such as used in a USB "thumb" drive, a PROM, a RAM, a ROM, or a magnetic tape. It is understood that these articles of manufacture record data, including computer program instructions, in a non-transitory manner. In general, the computer programs may be implemented in any programming language, such as LISP, Perl, Ruby, C, C++, C#, PROLOG, or in any byte code language such as JAVA. The software programs may be stored on or in one or more articles of manufacture as object code.

While this specification contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Having described certain embodiments of methods and systems, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for comparing a first file hierarchy to a second file hierarchy, the method comprising:
   comparing, by an audit system comprising at least one computing processor, a first plurality of signatures representing element information for a first file hierarchy to a second plurality of signatures representing element information for a second file hierarchy, the comparison of the first plurality of signatures to the second plurality of signatures including a first comparison of signatures of a first type and a second comparison of signatures of a second type;
   determining, by the audit system, based on the comparison of the first plurality of signatures to the second plurality of signatures, whether the first file hierarchy is likely to be a modified copy of the second file hierarchy; and
   determining, by the audit system, based on the first comparison of signatures of the first type and the second comparison of signatures of the second type,
      that the first file hierarchy and the second file hierarchy are related and
      that at least one difference between the first file hierarchy and the second file hierarchy is one of:
         a file present in one of the first file hierarchy and the second file hierarchy is not present in the other of the first file hierarchy and the second file hierarchy, or
         a file is present in the first file hierarchy with a first file size and present in the second file hierarchy with a second file size different from the first file size.

2. The method of claim 1, the method comprising:
   comparing, by the audit system, a first signature of the first signature type from the first plurality of signatures to a second signature of the first signature type from the second plurality of signatures;
   selecting, by the audit system, the second signature type based on the comparison of the first signature of the first signature type to the second signatures of the first signature type; and
   comparing, by the audit system, a first signature of the second signature type from the first plurality of signatures to a second signature of the second signature type from the second plurality of signatures.

3. The method of claim 2, wherein the first signature type is for signatures representing a first set of element attributes and the second signature type is for signatures representing a second set of element attributes, the first set of element attributes comprising at least one attribute not present in the second set of element attributes.

4. The method of claim 1, the method comprising comparing, by the audit system, a first signature from the first plurality of signatures to a second signature from the second plurality of signatures, wherein the first signature and the second signature each comprise a representation of element descriptors created according to a first set of string descriptor formatting rules and a first set of element selection criteria.

5. The method of claim 4, wherein the representation is a fixed-length digest of a string descriptor comprising a deterministic aggregation of the element descriptors.

6. The method of claim 5, comprising calculating the fixed-length digest using one of: a cyclic redundancy check, a message digest, an MD5 hash function, a cryptographic hash, and a non-cryptographic hash function.

7. The method of claim 1, the method comprising identifying, by the audit system, a first difference between the first file hierarchy and the second file hierarchy.

8. The method of claim 1, the method comprising:
   comparing, by the audit system, a first signature from the first plurality of signatures to a second signature from the second plurality of signatures, wherein the first signature and the second signature are of a first signature type representative of multiple directory levels; and
   comparing, by the audit system, a third signature from the first plurality of signatures to a fourth signature from the second plurality of signatures, wherein the third signature and the fourth signature are of a second signature type representative of a single directory level.

9. The method of claim 1, the method comprising:
   determining, by the audit system, based on the comparison of the first plurality of signatures to the second plurality of signatures, that the first file hierarchy is not likely to be a modified copy of the second file hierarchy;
   comparing, by the audit system, a third plurality of signatures representing element information for the first file hierarchy to a fourth plurality of signatures representing element information for a third file hierarchy;
   determining, by the audit system, based on the comparison of the third plurality of signatures to the fourth plurality of signatures, whether the first file hierarchy is likely to be a modified copy of the third file hierarchy.

10. A system for comparing a first file hierarchy to a second file hierarchy, the system comprising one or more computing processors configured to perform the operations of:
   comparing a first plurality of signatures representing element information for a first file hierarchy to a second plurality of signatures representing element information for a second file hierarchy, the comparison of the first plurality of signatures to the second plurality of signatures including a first comparison of signatures of a first type and a second comparison of signatures of a second type;
   determining based on the comparison of the first plurality of signatures to the second plurality of signatures, whether the first file hierarchy is likely to be a modified copy of the second file hierarchy; and determining, by the audit system, based on the first comparison of signatures of the first type and the second comparison of signatures of the second type,
that the first file hierarchy and the second file hierarchy are related and
that at least one difference between the first file hierarchy and the second file hierarchy is one of:
a file present in one of the first file hierarchy and the second file hierarchy is not present in the other of the first file hierarchy and the second file hierarchy, or
a file is present in the first file hierarchy with a first file size and present in the second file hierarchy with a second file size different from the first file size.

11. The system of claim 10, the one or more computing processors configured to perform the operations of:
comparing a first signature of the first signature type from the first plurality of signatures to a second signature of the first signature type from the second plurality of signatures;
selecting the second signature type based on the comparison of the first signature of the first signature type to the second signatures of the first signature type; and
comparing a first signature of the second signature type from the first plurality of signatures to a second signature of the second signature type from the second plurality of signatures.

12. The system of claim 11, wherein the first signature type is for signatures representing a first set of element attributes and the second signature type is for signatures representing a second set of element attributes, the first set of element attributes comprising at least one attribute not present in the second set of element attributes.

13. The system of claim 10, the one or more computing processors configured to perform the operation of comparing a first signature from the first plurality of signatures to a second signature from the second plurality of signatures, wherein the first signature and the second signature each comprise a representation of element descriptors created according to a first set of string descriptor formatting rules and a first set of element selection criteria.

14. The system of claim 13, wherein the representation is a fixed-length digest of a string descriptor comprising a deterministic aggregation of the element descriptors.

15. The system of claim 14, the one or more computing processors configured to perform the operation of calculating the fixed-length digest using one of: a cyclic redundancy check, a message digest, an MD5 hash function, a cryptographic hash, and a non-cryptographic hash function.

16. The system of claim 10, the one or more computing processors configured to perform the operation of identifying a first difference between the first file hierarchy and the second file hierarchy.

17. The system of claim 10, the one or more computing processors configured to perform the operations of:
comparing a first signature from the first plurality of signatures to a second signature from the second plurality of signatures, wherein the first signature and the second signature are of a first signature type representative of multiple directory levels; and
comparing a third signature from the first plurality of signatures to a fourth signature from the second plurality of signatures, wherein the third signature and the fourth signature are of a second signature type representative of a single directory level.

18. The system of claim 10, the one or more computing processors configured to perform the operations of:
determining based on the comparison of the first plurality of signatures to the second plurality of signatures, that the first file hierarchy is not likely to be a modified copy of the second file hierarchy;
comparing a third plurality of signatures representing element information for the first file hierarchy to a fourth plurality of signatures representing element information for a third file hierarchy;
determining, based on the comparison of the third plurality of signatures to the fourth plurality of signatures, whether the first file hierarchy is likely to be a modified copy of the third file hierarchy.

* * * * *